US007857225B2

(12) United States Patent  
Challa et al.

(10) Patent No.: US 7,857,225 B2
(45) Date of Patent: Dec. 28, 2010

(54) SYSTEM, METHOD AND APPARATUS FOR COMMUNICATING INFORMATION FROM A PERSONAL ELECTRONIC DEVICE

(75) Inventors: Nagesh Challa, Saratoga, CA (US); Venkata T. Gobburu, San Jose, CA (US); Michel E. Gannage, Los Altos Hills, CA (US)

(73) Assignee: MoBeam Inc., Cupertino, CA (US)

( * ) Notice: Subject to any disclaimer, the term of this patent is extended or adjusted under 35 U.S.C. 154(b) by 479 days.

(21) Appl. No.: 11/998,690

(22) Filed: Nov. 30, 2007

(65) Prior Publication Data

US 2008/0128505 A1     Jun. 5, 2008

Related U.S. Application Data

(60) Provisional application No. 60/872,628, filed on Dec. 1, 2006.

(51) Int. Cl.
    *G06K 7/10*     (2006.01)
(52) U.S. Cl. ............................................. 235/462.45
(58) Field of Classification Search ............... 235/383, 235/385, 472.01, 462.45
    See application file for complete search history.

(56) References Cited

U.S. PATENT DOCUMENTS

| 6,305,607 | B1 | 10/2001 | Katz et al. |
| 6,685,093 | B2 | 2/2004 | Challa et al. |
| 6,736,322 | B2 | 5/2004 | Gobburu et al. |
| 6,877,665 | B2 | 4/2005 | Challa et al. |
| 6,974,078 | B1 | 12/2005 | Simon |
| 2001/0046862 | A1 | 11/2001 | Coppinger et al. |
| 2004/0198247 | A1 | 10/2004 | Jokinen et al. |
| 2005/0222961 | A1* | 10/2005 | Staib et al. ................... 705/64 |
| 2007/0254712 | A1* | 11/2007 | Chitti ......................... 455/558 |

FOREIGN PATENT DOCUMENTS

| JP | 10-49613 | 2/1998 |
| WO | WO 00/03328 | 1/2000 |
| WO | WO 02/058026 | 7/2002 |

OTHER PUBLICATIONS

Cellfire, Inc., Cellfire FAQs, Internet Document, undated, 3 pages, (downloaded from the Internet on Dec. 1, 2006).
Ekman, Ivar, Wireless: Tagging Cellphones as Electronic Wallets, International Herald Tribune, Internet Document, 4 pages, Jan. 10, 2006; (date alleged by content creator; downloaded from the Internet on Nov. 15, 2006).
Ecma International, Near Field Communication White Paper, Internet Publication, 5 pages, 2004 (date alleged by content creator; downloaded from the Internet).

(Continued)

*Primary Examiner*—Seung H Lee
(74) *Attorney, Agent, or Firm*—David H. Carroll

(57) ABSTRACT

An accessory for a personal electronic device detects data encoded into light, sound, vibration energy, radio frequency energy, or a combination thereof, and provides the encoded data either to a bar code scanner using light, or to an NFC terminal using NFC protocols. The accessory may be stand-alone, or attachable to the personal electronic device from a suitable housing or integrated into a housing component of the personal electronic device.

29 Claims, 22 Drawing Sheets

OTHER PUBLICATIONS

Intuitive Devices, Inc., Blinkit® the iPod® Fun Light, Internet Document, 2 pages, Oct. 18, 2006 (date alleged by content creator; downloaded from the Internet on Aug. 14, 2007).

NFC Forum, NFC Forum News Conference, 36 pages, Jun. 5, 2006 (date alleged by content creator; downloaded from the Internet).

Pinouts.RU, Apple iPod Dock Interface Pinout, Internet Document, undated, 5 pages (downloaded from the Internet on Jun. 19, 2007).

U.S. Appl. No. 60/872,628 for Nagesh Challa, et al., entitled "System, Method and Apparatus for Communicating Information From a Personal Electronic Device", filed Dec. 1, 2006.

Visa International, How Would You Like to Pay for That? Cash, Card or Phone?, Internet Document, 3 pages, Apr. 5, 2006 (date alleged by content creator; downloaded from the Internet on Nov. 15, 2006).

* cited by examiner

SYSTEM, METHOD AND APPARATUS FOR COMMUNICATING INFORMATION FROM A PERSONAL ELECTRONIC DEVICE

CROSS-REFERENCE TO RELATED APPLICATIONS

This application claims the benefit of U.S. Provisional Patent Application Ser. No. 60/872,628 filed Dec. 1, 2006, which hereby is incorporated herein in its entirety by reference thereto.

BACKGROUND OF THE INVENTION

1. Field of the Invention

This invention relates generally to communicating encoded information from a personal electronic device, and more particularly to systems, methods and apparatus for communicating information from a personal electronic device to a bar code scanner or a NFC terminal.

2. Description of the Related Art

The use of bar code scanners in a great many aspects of everyday life is commonplace. Bar code scanners are found in many different types of facilities, including supermarkets, airport security; check-in and boarding areas, stadiums, libraries, test centers, conference centers, and many other places. The use of bar code scanners has dramatically increased the speed at which many commonplace transactions can be completed.

While typically printed on paper labels and stubs, bar codes may also be presented on the electronic displays of personal electronic devices such as mobile communications devices. For example, in International Publication no. WO 00/03328 dated Jan. 20, 2000, Motorola Inc. of Schaumburg, Ill., describes the display of bar coded information on a selective call receiver ("SCR"). Demographic information concerning the user of the SCR is stored in the SCR. The demographic information is visually displayed on the SCR as a bar code such that it can be read by a bar code scanner, as in a store or at a point-of-sale. A stored coupon may also be displayed in bar code format so that it can be read and redeemed at the point-of-sale. A stored affinity card code and a unique identifier may also be displayed in bar code format so that they can be read to identify a selected affinity group and the customer at the point-of-sale. As a further example, Aeritas Inc. of Dallas, Tex., has proposed using voice recognition technology to allow a cellular telephone user to identify himself or herself while obtaining wirelessly from an airline computer an electronic bar coded boarding pass at the airport using only a cellular telephone. As proposed, the electronic boarding pass may be displayed as a bar code at the time of boarding on the screen of the cellular telephone so that the gate attendant may scan the boarding pass in a conventional manner. Cellfire Inc. of San Jose, Calif., provides the Cellfire application, which stores discounts and coupons on a cell phone and displays the coupon code on the cell phone display so that a store clerk may manually type in the code at the point of sale terminal.

While presenting information such as coupons and user affinity information in bar code form on a cell phone display can be quite useful, the technique has several disadvantages. Some bar code scanners, for example, cannot reliably read bar codes displayed on certain types of cellular phone displays because the contrast ratio between the bars and spaces shown on the screen, which typically is a liquid crystal display ("LCD"), is not sufficient. Further, the physical dimension and/or resolution of the display may also limit the size of the bar code that may be displayed at one time.

A new technology referred to as Near Field Communications ("NFC") facilitates secure, short-range communication between electronic devices, such as mobile phones, PDAs, computers and payments terminals via a fast and easy wireless connection. Combined with contactless payment technology, NFC can enable secure and convenient purchases with a mobile device. Suitable types of transactions include making a purchase at a coffee shop, downloading a movie trailer in a DVD store, shopping from a TV at home, and buying concert tickets from a smart poster. See Visa International, Inc., News Release: How Would You Like to Pay for That—Cash, Card or Phone, Apr. 5, 2006. Unfortunately, NFC technology has not yet been widely incorporated into electronic devices.

BRIEF SUMMARY OF THE INVENTION

While personal electronic devices have great potential for enhancing transactions conducted at points-of-sale and elsewhere in view of the extensive installed base of bar code scanners and the growth in NFC terminals, adoption of these technologies by manufacturers of personal electronic devices has been disappointing. Advantageously, the present invention facilitates customer use of one or both of these technologies without need to need to build the technologies into the personal electronic devices.

One embodiment of the present invention is a method of using an accessory to communicate information from a personal electronic device to a bar code scanner, comprising positioning the accessory in proximity to the personal electronic device; receiving on the accessory encoded data from the personal electronic device; generating in the accessory a signal from the encoded data to simulate a reflection of a scanning beam being moved across a static visual image of a bar code formatted form of the encoded data; and transmitting the signal as light pulses from the accessory to the bar code scanner while the accessory is in proximity to the personal electronic device. In one variation of the method, the positioning step comprises removably attaching the accessory to the personal electronic device. In another variation of the method, the positioning step comprises positioning the accessory in proximity to but physically separate from the personal electronic device.

Another embodiment of the present invention is a method of using an accessory to communicate information from a personal electronic device to an NFC terminal, comprising positioning the accessory in proximity to the personal electronic device; receiving on the accessory encoded data from the personal electronic device; generating in the accessory an NFC protocol signal from the encoded data; and transmitting the signal from the accessory to the NFC terminal while the accessory is in proximity to the personal electronic device. In one variation of the method, the positioning step comprises removably attaching the accessory to the personal electronic device. In another variation of the method, the positioning step comprises positioning the accessory in proximity to but physically separate from the personal electronic device.

Another embodiment of the present invention is a method of using an accessory to communicate information from a personal electronic device to a bar code scanner or an NFC terminal, comprising receiving on the accessory encoded data from the personal electronic device; when communication to an NFC terminal is desired, generating in the accessory an NFC protocol signal from the encoded data and transmitting the NFC protocol signal from the accessory to the NFC terminal; and when communication to a bar code scanner is desired, generating in the accessory a signal from the encoded data to simulate a reflection of a scanning beam being moved across a static visual image of a bar code formatted form of the encoded data, and transmitting the signal as light pulses from the accessory to the bar code scanner.

Another embodiment of the present invention is an accessory for communicating information from a personal electronic device to a bar code scanner, the accessory comprising a detector for receiving encoded data from the personal electronic device; a processor for generating a signal from the encoded data to simulate a reflection of a scanning beam being moved across a static visual image of a bar code formatted form of the encoded data; a light source for transmitting the signal as light pulses to the bar code scanner; and a housing containing the detector, processor, and the light source. The housing is removably attachable to the personal electronic device.

Another embodiment of the present invention is an accessory for communicating information from a personal electronic device to an NFC terminal, comprising a detector for receiving encoded data from the personal electronic device; a processor for generating an NFC protocol signal from the encoded data; a transmitter for transmitting the signal from the accessory to the NFC terminal; and a housing containing the detector, processor, and the light source. The housing is distinct and separate from the personal electronic device.

Another embodiment of the present invention is an accessory for communicating information from a personal electronic device to a bar code scanner or an NFC terminal, comprising a detector for receiving encoded data from the personal electronic device; a processor for generating an NFC protocol signal from the encoded data, and a simulation signal from the encoded data to simulate a reflection of a scanning beam being moved across a static visual image of a bar code formatted form of the encoded data; a transmitter for transmitting the NFC protocol signal to the NFC terminal; and a light source for transmitting the signal as light pulses from the accessory to the bar code scanner.

DETAILED DESCRIPTION OF THE INVENTION, INCLUDING THE BEST MODE

Figure 1:
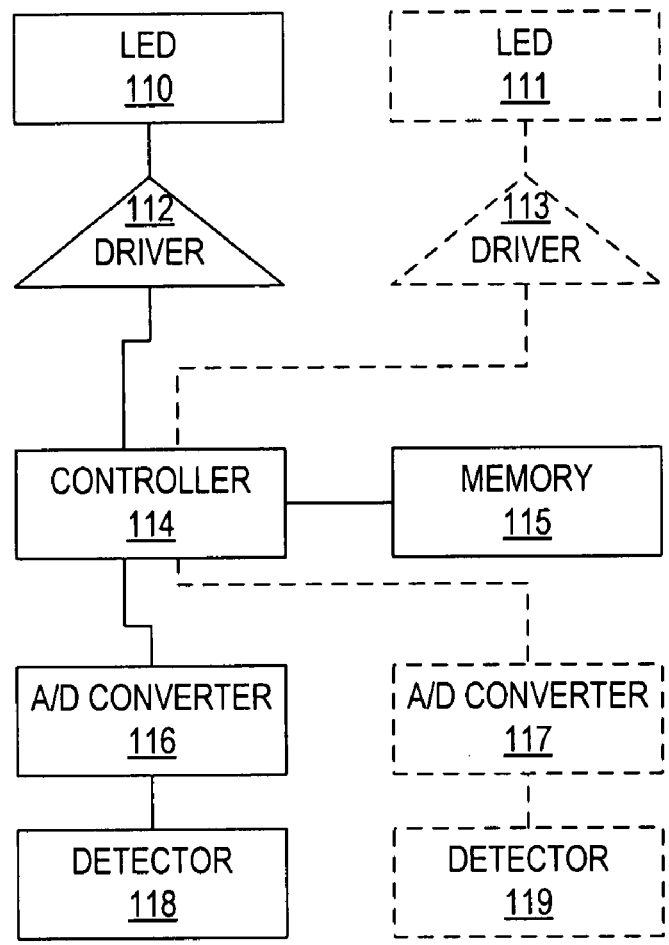
FIG. 1 is a schematic block diagram of a circuit suitable for an accessory in accordance with the present invention.

The techniques described herein facilitate the reliable communication of information to bar code scanners from personal electronic devices. Personal electronic devices are electronic devices that can be easily carried on the person, and include such as mobile phones, personal digital assistants ("PDA"), gaming devices, audio and video players, fobs, and USB Flash drives. Personal electronic devices are suitable for many uses, including communications, entertainment, security, commerce, guidance, data storage and transfer, and so forth, and may be dedicated to a particular use or may be suitable for a combination of uses. These techniques described herein enable the large and growing population of personal electronic devices to use well established and widely adopted bar code standards to access the current commercial infrastructure, which is highly dependent on bar code scanners at points of sale. The same techniques may be used to access many other goods and services in addition to conventional commercial services.

Personal electronic devices may be used to communicate information to a bar code scanner by light. These devices have light sources such as the device screen and LEDs that may be driven by a simulated signal so that light from the light source simulates a reflection of a scanning beam being moved across a static visual image of the bar code. However, some personal electronic devices have light sources that either are not capable of pulsing quickly enough, or the light sources are controlled by application program interfaces ("API") that for any number of technical or business reasons cannot be modified to pulse the light source as necessary. Some types of personal electronic devices may not have any light sources, even though they are capable of receiving or storing information of a type that could usefully be communicated to a bar code scanner.

Personal electronic devices that are unable to communicate information to a bar code scanner with light may be enabled to do so by the use of an accessory. The accessory may be a separate device that is used with a personal electronic device either as an attachment or add-on to the personal electronic device, or as a stand-alone device. Alternatively, the accessory may be built into a removable component of the device, such as a battery cover or removable face plate. The accessory is provided with the ability to receive a data-containing signal from the personal device, convert the data-containing signal to a simulated signal, and drive a suitable light with the simulated signal for communicating the data to a bar code scanner.

Even though a particular personal electronic device may be inherently unable to transmit light in accordance with the simulated signal, or to even generate the simulated signal, it may be able to communicate the data in other forms. Examples include the slow or fast flashing of the screen or other lights, by audible sounds from a speaker such as Dual-Tone Multi-Frequency ("DTMF") tones, by radio frequency ("RF") emissions from the antenna in the case of mobile phones and wireless network-enabled devices (WiFi, Bluetooth, Wibree, and the like), or in any other manner in which the personal electronic device is equipped to communicate. Various wired outputs such as connectors and audio jacks may also be suitable. When communicating with sound, for example, the data-containing signal should be distinguishable from standard ring tones and the sounds associated with normal conversation. When communicated with RF emissions from mobile phones, for example, the data-containing signal should be an RF emissions pattern that is distinguishable from emissions that occur during mobile phone registration and handshaking signals and during communications. The accessory receives the data-containing signal from the personal device, converts the data-containing signal to a simulated signal, and drives a suitable light with the simulated signal for communicating the data to a bar code scanner with light that simulates a reflection of a scanning beam being moved across a static bar code image. The light provided is interpreted by the control system of the bar code scanner as an actual scan of a bar code image, which enables the personal electronic device to appear as any physical item that might carry bar code image, including a coupon, affinity card, drivers license, security card, airline boarding pass, event ticket, and so forth. Moreover, the interpretation by the control system is not limited to a bar code on a physical item, and may be used for any purpose that relies on communication of an identification code, and even for communication of other types of information including identity and credit information.

The data itself that is communicated by the personal electronic device to the accessory may be encoded in any convenient format. One suitable format is a slow bar code format. However, the data may be communicated in raw format, an intermediate format, or even in the form of the simulated signal itself. The amount of processing required in the accessory is somewhat dependent on the data format used, and whether the accessory is programmed to process only a particular format or to detect the data format and adapt to it. An example of a simple data format is a slowed-down bar code format, which need only be recorded and reproduced at a faster rate by the accessory.

An example of a suitable circuit for the accessory is shown in FIG. 1. The detector 118, illustratively a photodiode, microphone, vibration detector, RF receiver, or other suitable type of detector, monitors for a signal from the personal electronic device. The received signal is converted into digital form in an A/D converter 116, and supplied to an input port of a controller 114. The controller 114 monitors the input port for bit patterns representing bar code information or other data, data markers, commands, and so forth, and executes the appropriate action. Where the data on the input port corresponds to bar code information or is to be converted to bar code information, the controller 114 processes the data using the memory 115 as necessary to generate the simulated signal, and applies the simulated signal from an output port to a driver 112 to drive an LED 110 so that the simulated signal is transmitted as light. If desired, multiple LEDs may be driven to provide the simulated signal at different wavelengths, to increase the intensity of the simulated signal, and so forth; see LED 111 and driver 113. Although LEDs generally and red and white LEDs in particular are suitable, the accessory may use any type of optical element capable of emitting light within the detection bandwidth of the bar code scanner and at a suitable intensity. Various optical elements useful for this purpose include light-reflective elements and screens, screen backlights, IR ports, lasers, light emitting diodes, thin film transistors, and light bulbs. To enhance reliability, the light source may be flashed multiple times over a variety of frequencies to cover many different scanner protocols.

While light, sound, vibration, RF signals, or any other signaling capability of the personal electronic device may be used individually to communicate data to the accessory, two or more may be used together to improve reliability, accuracy and responsiveness. In this case, the accessory would be provided with multiple detectors. FIG. 1 shows in phantom lines an optional second detector 119 with its associated A/D converter 117.

Figure 2:
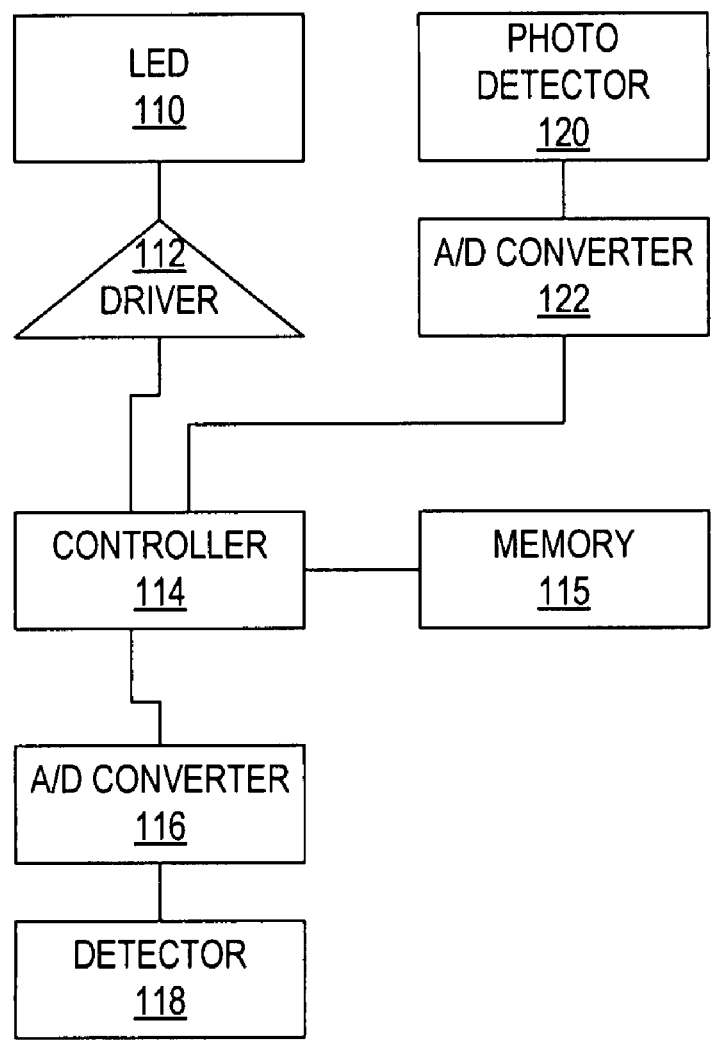
FIG. 2 is a schematic block diagram of a variation of the circuit of FIG. 1.

Other circuitry may be included in the accessory to improve performance. FIG. 2 shows the circuit of FIG. 1 supplemented with a photodetector 120 and A/D converter 122 for detecting a scan signal from the bar code scanner. The scan parameters are determined from the detected scan signal by the controller 114, and used to optimize the simulated signal for driving the LED 110.

Communications between the accessory and the personal electronic device may be secured in any desired manner, particularly if credit card information is being communicated. Suitable security techniques are well known in the art, and include the use of rolling security codes.

The accessory may be powered in any desired manner. Small batteries may be used. Alternatively, one or more photovoltaic cells may be provided on a surface of the accessory to generate power from the screen or other light source of the personal electronic device, or from ambient light. Alternatively, an accessory designed for a mobile phone may have a radio frequency coupler for coupling to RF emissions from the mobile phone to charge an on-board battery or capacitor. When used with personal electronic devices that make power available on an auxiliary connector, the accessory may be provided with a connector for mating with the auxiliary connector of the personal electronic device.

Accessory Suitable for Attachment to a Personal Electronic Device

Figure 3:
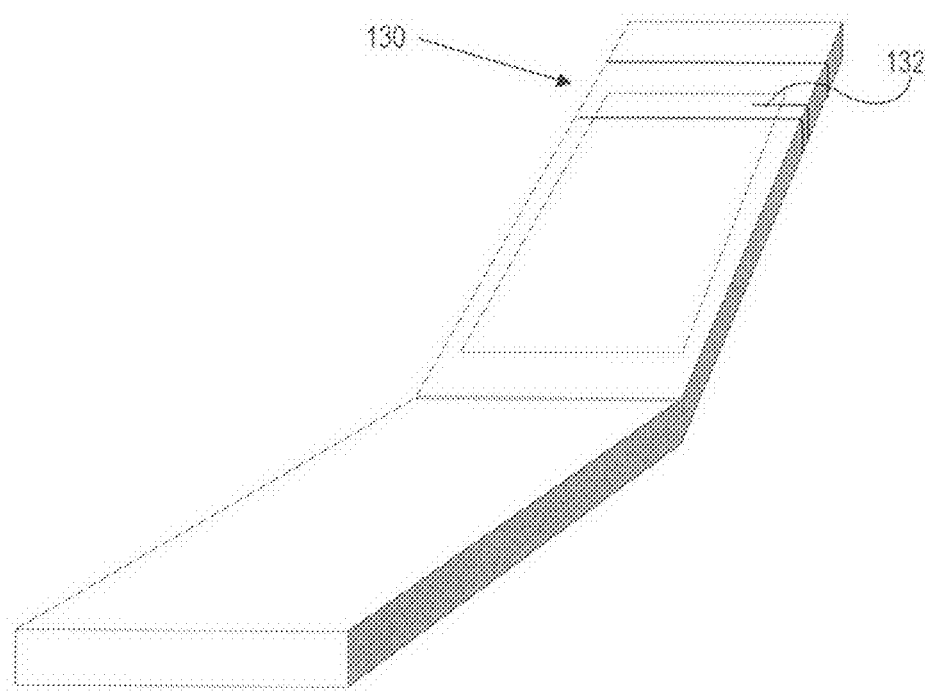
FIG. 3 is a top perspective view of a mobile phone equipped with an accessory in accordance with an aspect of the present invention.
Figure 4:
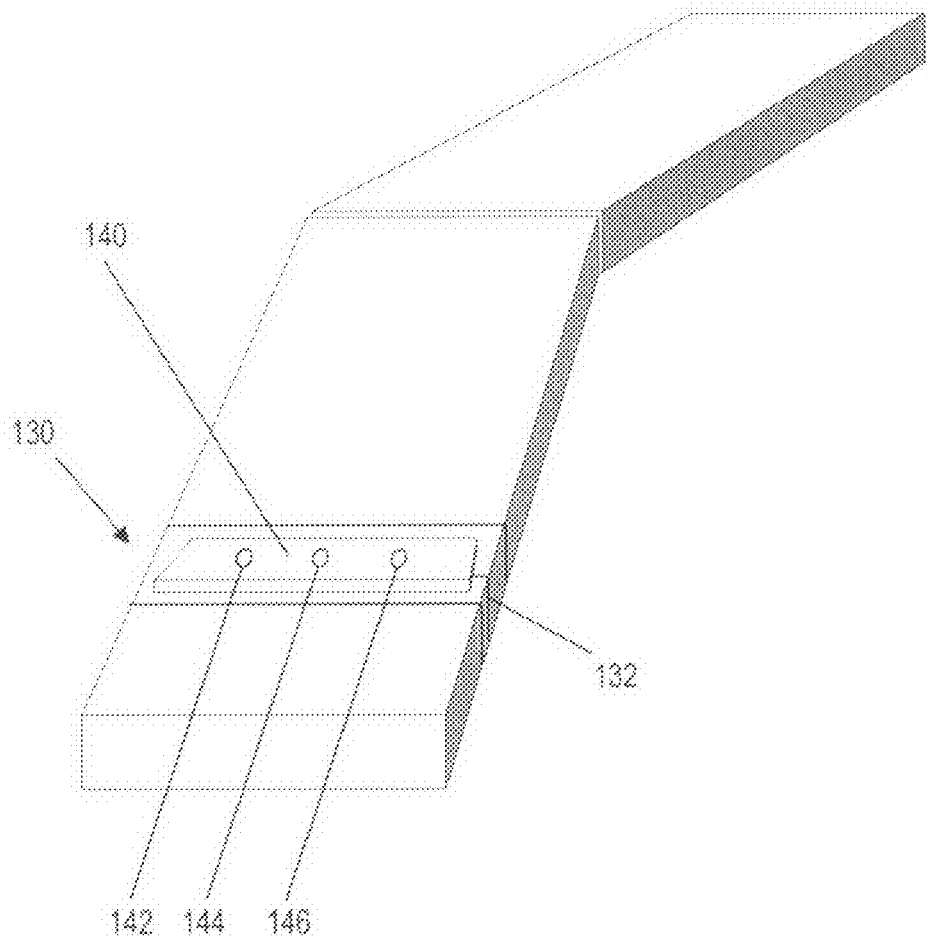
FIG. 4 is a bottom perspective view of the mobile phone of FIG. 3.

The accessory may be designed to be physically attached to the personal electronic device, either as a separate device or incorporated into a housing component or other component of the personal electronic device. FIG. 3 is an example of a separate accessory for a mobile phone that uses light from a screen. Although a particular type of personal electronic device, namely a mobile phone, is shown in FIG. 3, the accessory of FIG. 3 is suitable for many other types of personal electronic devices. Moreover, while a clamshell type mobile phone is shown in FIG. 3, a candy bar style or other type may be used as well. A clear band 130 containing an optical aperture at the distal end of a thin signal transmission medium 132 is slipped over the body of the phone so that the optical aperture is positioned in proximity to the screen. While the band is non-obtrusively positioned at the top of the screen with the optical aperture in a corner of the screen, the band may be positioned as desired to accommodate placement of the encapsulated circuit on the back of the body. The flip side of the same mobile phone is shown in FIG. 4, where the signal transmission medium 132 is shown to extend into a suitable housing 140 which contains the circuit of FIG. 1. Illustratively, the housing 140 is injection molded plastic, encapsulates the end of the signal transmission medium 132, and contains the circuit of FIG. 1 and a small battery. One or more LEDs such as LEDs 142, 144 and 146 are mounted on the housing 140.

The clear band may be made of an elastic plastic or may contain an elastic section so that it may adapt to personal electronic devices of different sizes. Alternatively, the band may be a strip with mechanical connectors such as Velcro® fabric fasteners at its ends, to adapt to personal electronic devices of different sizes. The band need not be clear throughout, although it should be clear where it overlies the screen. Other variations include a clear patch having a suitable clear screen adhesive on one surface, for application to the screen.

In one illustrative mode of operation, the mobile phone flashes the backlight of the screen under control of a downloaded Java ME (Java Platform Micro-Edition or J2ME) application, which many mobile phones are capable of running. Other applications that can flash mobile phone screens and that can be downloaded and run on many types of mobile phones include ring-tone like applications and short code SMS (Short Message Service) applications. Typically, the flashing rate of the backlight is limited to about 1 or 2 milliseconds. The light flashes enter into the optical aperture, are converted to digital form, and are stored by the controller into the memory. When the bar code data in the memory is complete, the stored data is read out and used to drive the LED at an appropriate rate for detection by the bar code scanner. Typically, bar code scanners scan at about a 20 or 30 microsecond rate, although the scan rate varies substantially depending on the type of scanner and the manufacturer of the scanner.

The light flashes may be but need not necessarily be a slower version of the simulated signal used to drive the LEDs. The screen backlight may be driven using any suitable signaling protocol, provided the controller (or equivalent such as a microprocessor or custom logic, all of which may be generally referred to as processors) in the encapsulated circuit is programmed or designed to match the protocol or to detect and conform to the protocol.

The pixels of the screen rather than or in addition to the backlight may be pulsed if desired. All of the pixels of the screen may be pulsed, or just the pixels near the optical aperture may be pulsed.

Figure 5:
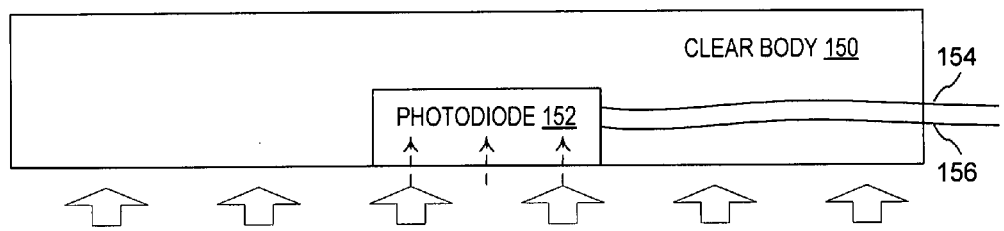
FIG. 5 is a cross-sectional view of a photodiode version of the accessory of FIG. 3.

The optical aperture and signal transmission medium may be realized in many different ways. FIG. 5 shows an example of a photodiode 152 embedded in a clear body 150, although the photodiode 152 need not be embedded but may be mounted on a surface or in a cavity of the plastic band. Although only one photodiode is shown, multiple photodiodes may be used if desired to increase sensitivity. The photodiode is illustrative of a type of optical aperture, and leads 154 and 156 from the photodiode are illustrative of a type of "signal transmission medium." For use with a clamshell phone, the photodiode 152 preferably is suitably thin to avoid creating a pressure point on the screen when the clamshell is closed.

Figure 6:
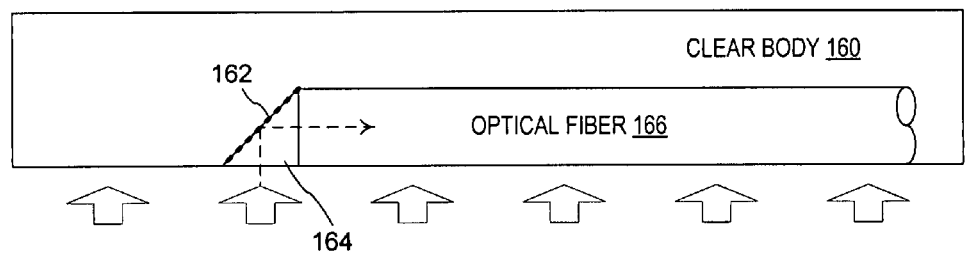
FIG. 6 is a cross-sectional view of an optical fiber version of the accessory of FIG. 3.
Figure 7:
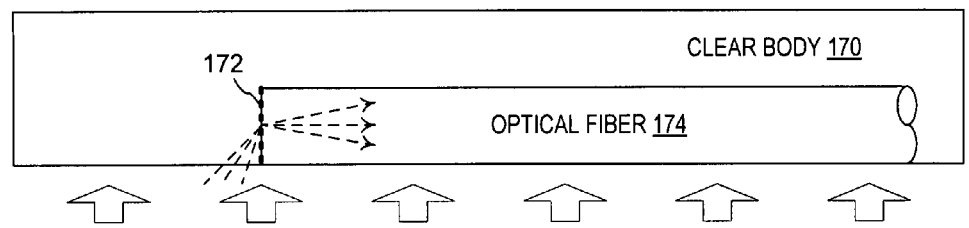
FIG. 7 is a cross-sectional view of another optical fiber version of the accessory of FIG. 3.

FIGS. 6 and 7 show examples of optical fibers 166 and 174, illustratively of the multimode type, embedded in respective clear bodies 160 and 170. The optical fibers need not be necessarily be embedded, but may be mounted on a surface of the clear body. Although only one fiber is shown, multiple fibers may be used if desired to increase sensitivity. In FIG. 6, a prism 164 of optically transparent material such as optical plastic or glass is provided with a mirrored surface 162 and is mounted at the end of the optical fiber 166, so that light from the screen is reflected into the end of the optical fiber 166. An air gap may be used instead of the mirrored surface 162, if desired. In FIG. 7, the end of the optical fiber 174 is processed to present a grating 172 that bends light from the screen into the optical fiber 174. If desired, ambient light may be excluded by providing a mask (not shown) about the end of the optical fiber so that only light from the direction of the screen may enter into the optical fiber.

While the embodiment of FIGS. 6 and 7 show an optical fiber, other types of waveguides may also be used.

Figure 8:
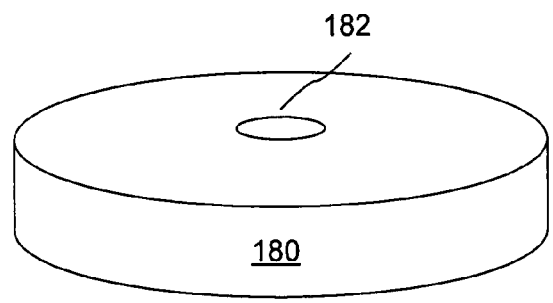
FIG. 8 is a top perspective view of a button accessory in accordance with an aspect of the present invention.
Figure 9:
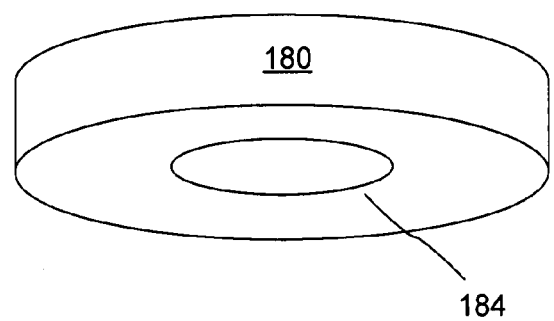
FIG. 9 is a bottom perspective view of the button accessory of FIG. 8 and shows a vibration sensor.

The separate-type of accessory may be provided in a variety of different types of housings and use a variety of different attachment techniques. In one variation, the housing may be a small round or oval button (other shapes such as rectangular are also suitable) which attaches to the personal electronic device in any suitable way, such as with adhesive or a section cup. FIGS. 8 and 9 are top perspective and bottom perspective views of an illustrative button accessory 180 that detects vibrations, and is particularly suitable for mobile phones that have a vibration ring mode. One or more LEDs, illustratively LED 182 as shown in FIG. 8, is mounted in the top of the accessory 180, and a vibration detector, illustratively a piezoelectric pressure sensor 184, is mounted in the bottom of the accessory, as shown in FIG. 9.

Figure 10:
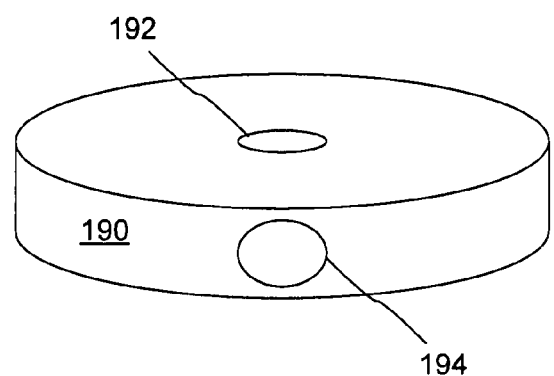
FIG. 10 is a top perspective view of a button accessory in accordance with as aspect of the present invention and having a sound sensor.

FIG. 10 is a top perspective view of an illustrative button accessory that detects sound from a speaker, and may be mounted to any type of sound-enabled personal electronic device, including mobile phones, audio and video players, gaming systems, and so forth in any suitable way, such as with adhesive or a section cup. One or more LEDs, illustratively LED 192 as shown in FIG. 10, is mounted in the top of the accessory, and a microphone 194 is ported to any suitable place, illustrative an edge of the accessory as shown in FIG. 10. The button accessory of FIG. 10 may be mounted with the microphone positioned near to the speaker of the personal electronic device. The button accessories of FIGS. 8, 9 and 10 also include a battery and suitable circuitry such as the circuit of FIG. 1, and should be suitably small so as to be relatively unobtrusive when mounted to a personal electronic device. Illustratively, a button accessory that is about the size of a quarter is suitable.

In one illustrative mode of operation for a mobile phone, for example, the mobile phone may play a series of tones from the speaker and/or activate the vibrator under control of a downloaded Java ME (Java Platform Micro-Edition or J2ME) application, which many mobile phones are capable of running. Other applications that can play tones and vibrations, and that can be downloaded and run on many types of mobile phones include ring-tone like applications and short code SMS (Short Message Service) applications. The tones and vibration patterns are converted to digital form, and are stored by the controller into the memory. When the bar code data in the memory is complete, the stored data is read out and used to drive the LED at an appropriate rate for detection by the bar code scanner.

Figure 11:
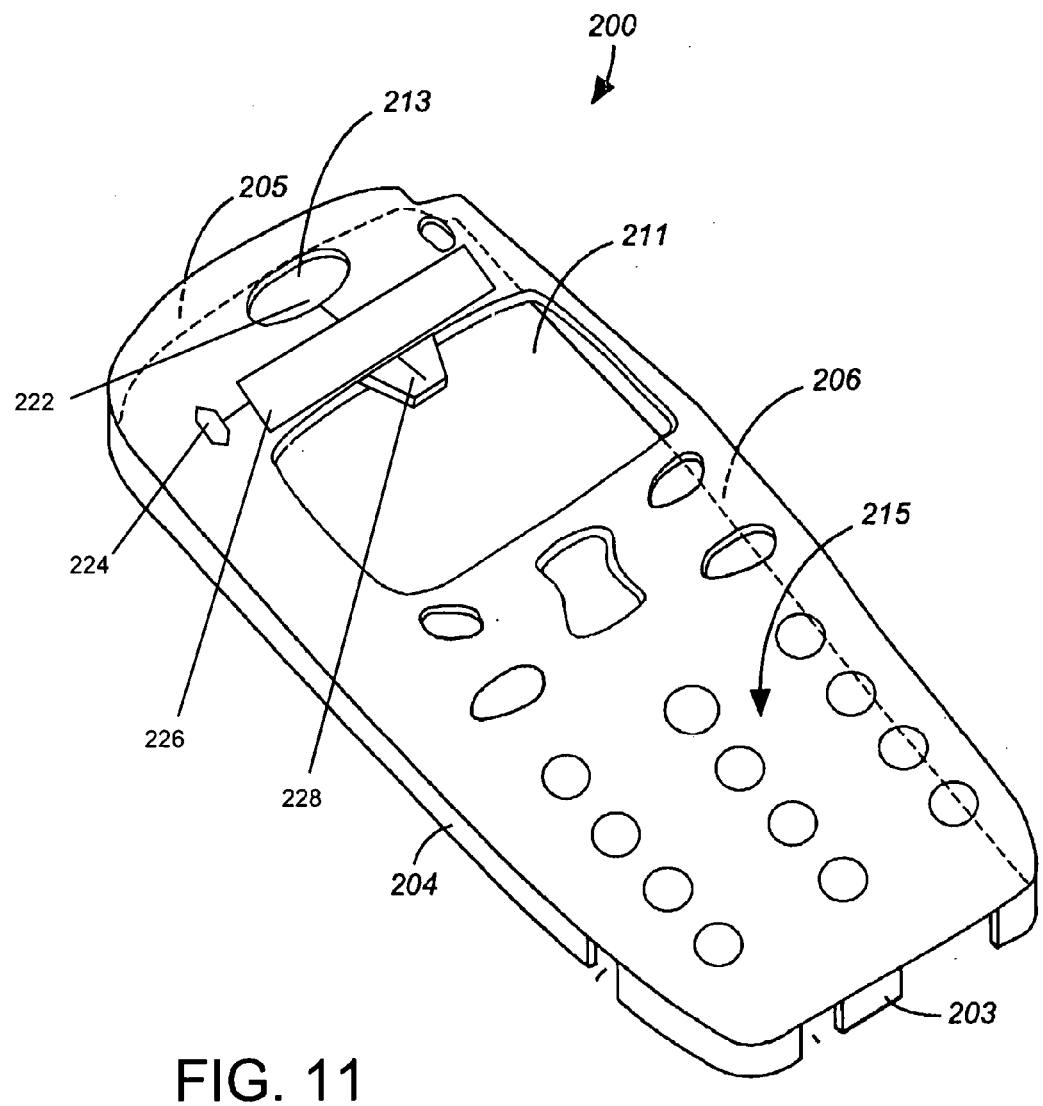
FIG. 11 is a top perspective view of a face plate that incorporates an accessory in accordance with an aspect of the present invention.

An example of an accessory that is incorporated into a mobile phone face plate 200 is shown in FIG. 11. The face plate 200 includes a speaker opening 213, a screen opening 211, various control and keypad openings 215, and various mounting flanges and clips 203, 204, 205 and 206. In this variation, the mobile phone face plate 200 has embedded therein a housing 226 contains a circuit such as the circuit of FIG. 1 and a battery, an LED 224, an optical aperture 228, and a sound aperture 222. The LED 224 may be located in any convenient spot, illustratively just above the display opening 211, and is wired to the circuit in the housing 226. The optical aperture 228 and the sound aperture 222 may be any suitable type of component located where desired. Illustratively, the optical aperture 228 may be a photodiode located in a projecting tab over the display opening 211, and the sound aperture 222 may be a piezoelectric microphone located near the speaker opening 213. A decorative or ornamental label, an identification label, or a logo or other form of promotional signage may be placed over the housing 226, if desired.

In one illustrative mode of operation for a mobile phone, for example, the mobile phone may both flash the backlight of the screen and plays a series of tones from the speaker under control of a downloaded Java ME (Java Platform Micro-Edition or J2ME) application, which many mobile phones are capable of running. Other applications that can flash mobile phone screens and play tones, and that can be downloaded and run on many types of mobile phones include ring-tone like applications and short code SMS (Short Message Service) applications. The light flashes and tones are converted to digital form, and are stored by the controller into the memory. When the bar code data in the memory is complete, the stored data is read out and used to drive the LED at an appropriate rate for detection by the bar code scanner.

Figure 12:
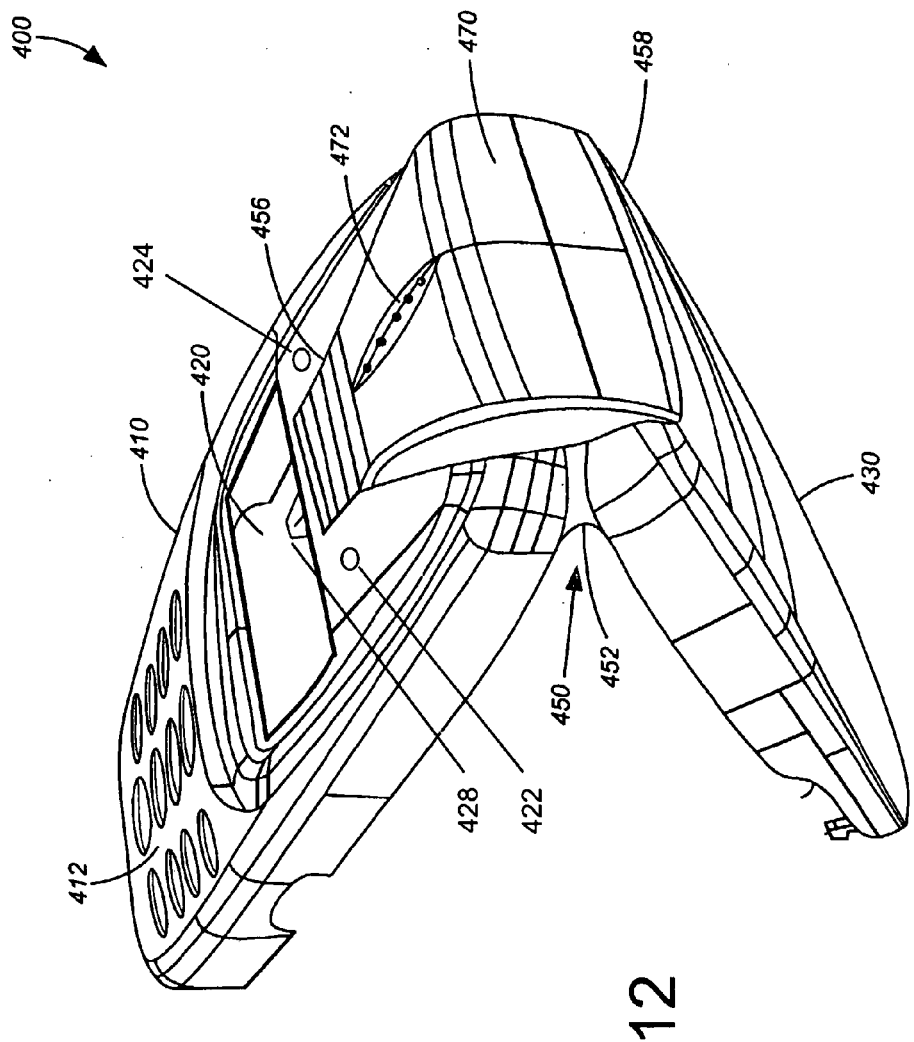
FIG. 12 is a top perspective view of a carrier that incorporates an accessory in accordance with an aspect of the present invention.
Figure 13:
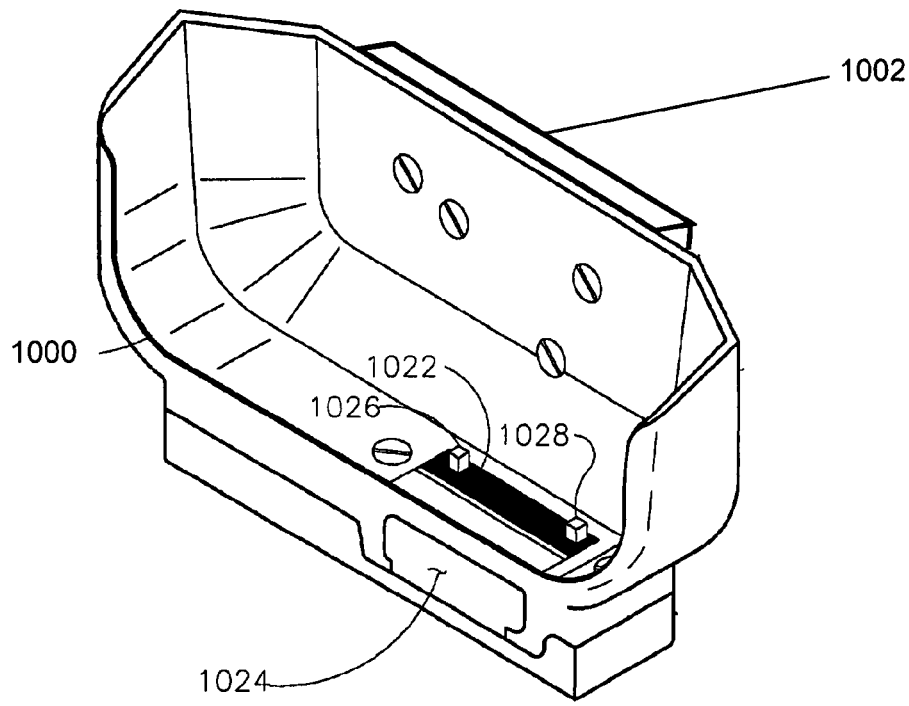
FIG. 13 is a top perspective view of a base plate that incorporates an accessory in accordance with an aspect of the present invention.

Many other types of housing and attachment techniques may be used. In one variation shown in FIG. 12, a suitable circuit and battery (not shown), an LED 424, an optical aperture 428, and a sound aperture 422 may be integrated into a carrier 400. Other components of the carrier 400 include front section 410 having a keypad area 412 and a screen opening 420, a back section 430, and a hinge section 450 having various hinge components 452, 456, 458, 470 and 472. An illustrative example of a suitable carrier is disclosed more fully in U.S. Patent Application Publication No. 2004/0198247 published Oct. 7, 2004 in the name of Jokinen et al., which hereby is incorporated herein in its entirety by reference thereto. In another variation shown in FIG. 13, a housing 1002 contains a suitable circuit, battery and LEDs, and is integrated into a base plate 1000 of the type that clips into and is retained by the connector that is commonly provided at the bottom of mobile phones and other types of personal electronic devices. Various illustrative connector components 1022, 1024, 1026 and 1028 are shown. An optical sensor and/or sound sensor (not shown) extends from the base plate 1000. An illustrative example of a suitable base plate is disclosed more fully in U.S. Patent Application Publication No. 2001/0046862 published Nov. 29, 2001 in the name of Coppinger et al. and entitled "Communication systems, components, and methods operative with programmable wireless devices," which hereby is incorporated herein in its entirety by reference thereto. Base plates designed for personal electronic devices that provide a power out conductor may include a connection to the power out conductor to supply the accessory, thereby allowing the battery to be omitted from the accessory. In another variation, the circuit and LED are integrated into a battery compartment cover that replaces the battery compartment cover provided with the mobile phone, and the optical and/or sound sensor extends from the battery cover in any suitable manner. In another variation, the circuit, LED and sensor or sensors are provided in a clip. In another variation, the circuit, LED and sensor or sensors are provided in a holster or carrying case for the personal electronic device.

Where applications such as Java ME are used to communicate with an accessory by flashing a screen, promotional material such as advertisements and logos may be displayed on the screen while it is being flashed.

Various examples of accessories that may be plugged into wired outputs of personal electronic devices such as multipurpose connectors and audio jacks are shown in FIGS. 25-35. FIGS. 25-28, 33 and 34 show implementations of accessories that are designed to be plugged into an audio output jack of a personal electronic device, while FIGS. 29-32 and 35 show implementations of accessories that are designed to be plugged into a multipurpose connector of a personal electronic device. Audio output jacks and multipurpose connectors are common on many types of personal electronic devices, including mobile phones and audio and video players.

Figures 25, 26, 27:
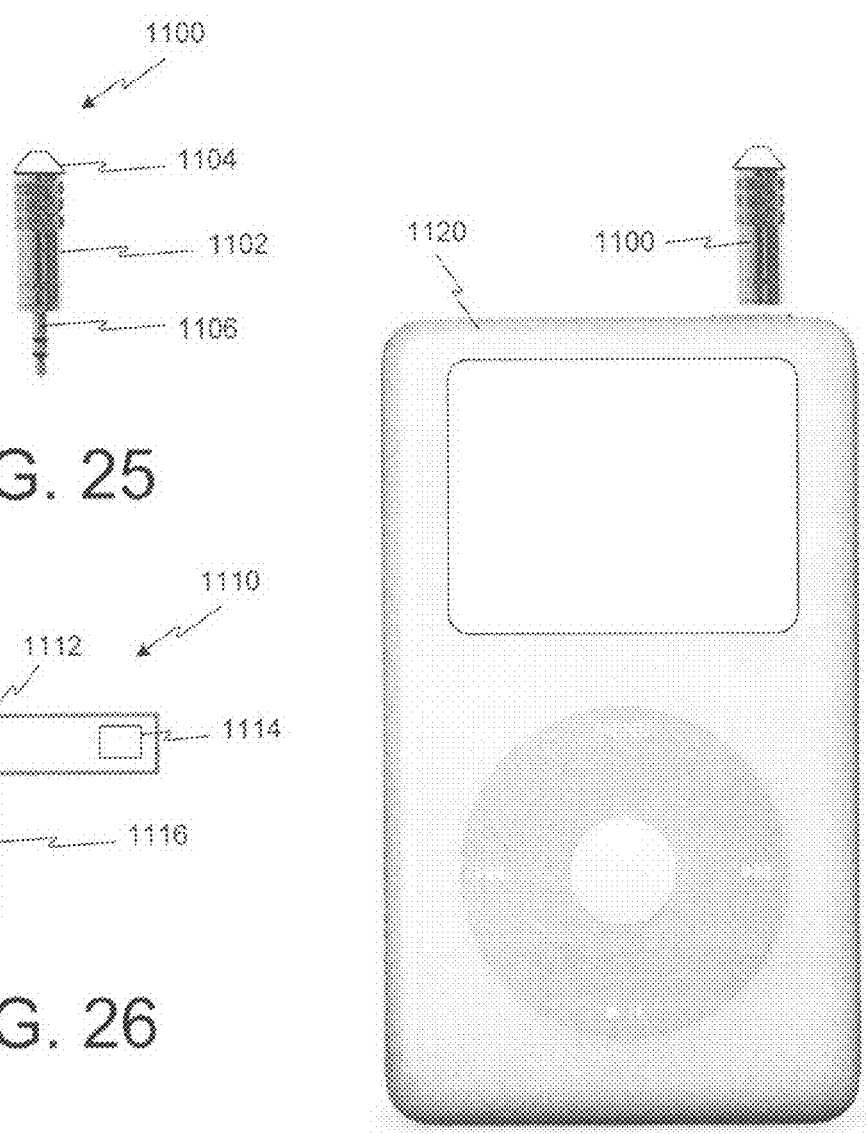
FIG. 25 is a side plan view of an audio plug style accessory.
FIG. 26 is a side plan view of another audio plug style accessory.
FIG. 27 is a front plan view of an iPod player into which the audio plug style accessory of FIG. 25 is inserted.

FIG. 25 shows an accessory in the form of a standard elongated audio plug connector 1100 that contains suitable electronics (not shown) within a casing 1102, a suitable LED 1104 at one end, and a suitable plug 1106 at the other end. FIG. 26 shows an accessory in the form of L-shaped connector 1110 that contains suitable electronics (not shown) within a casing 1112, a suitable LED 1114 mounted along an edge of the casing 1112, and a suitable plug 1116 extending at a right angle from the casing 1112. The LED 1114 may be provided on either side, either facing in the same direction as the screen so that light from the LED 1114 is presented when the user "presents" the personal electronic device to the bar code scanner, or facing in the opposite direction as the screen so that light from the LED 1114 may be presented to the bar code scanner even as the user reviews the offer on the screen. If desired, light may be emitted in multiple directions simultaneously, either by providing several LEDs along various edges of the casing 1112, or by placing an LED inside the casing 1112 so as to reflect in multiple directions through one or more optical windows (not shown) in the casing.

FIG. 27 shows the accessory 1100 plugged into a standard headphone output jack on the top edge of a personal electronic device, illustratively an iPod® player 1120 which is available from Apple Computer Inc. of Cupertino, Calif., USA.

Figure 28:
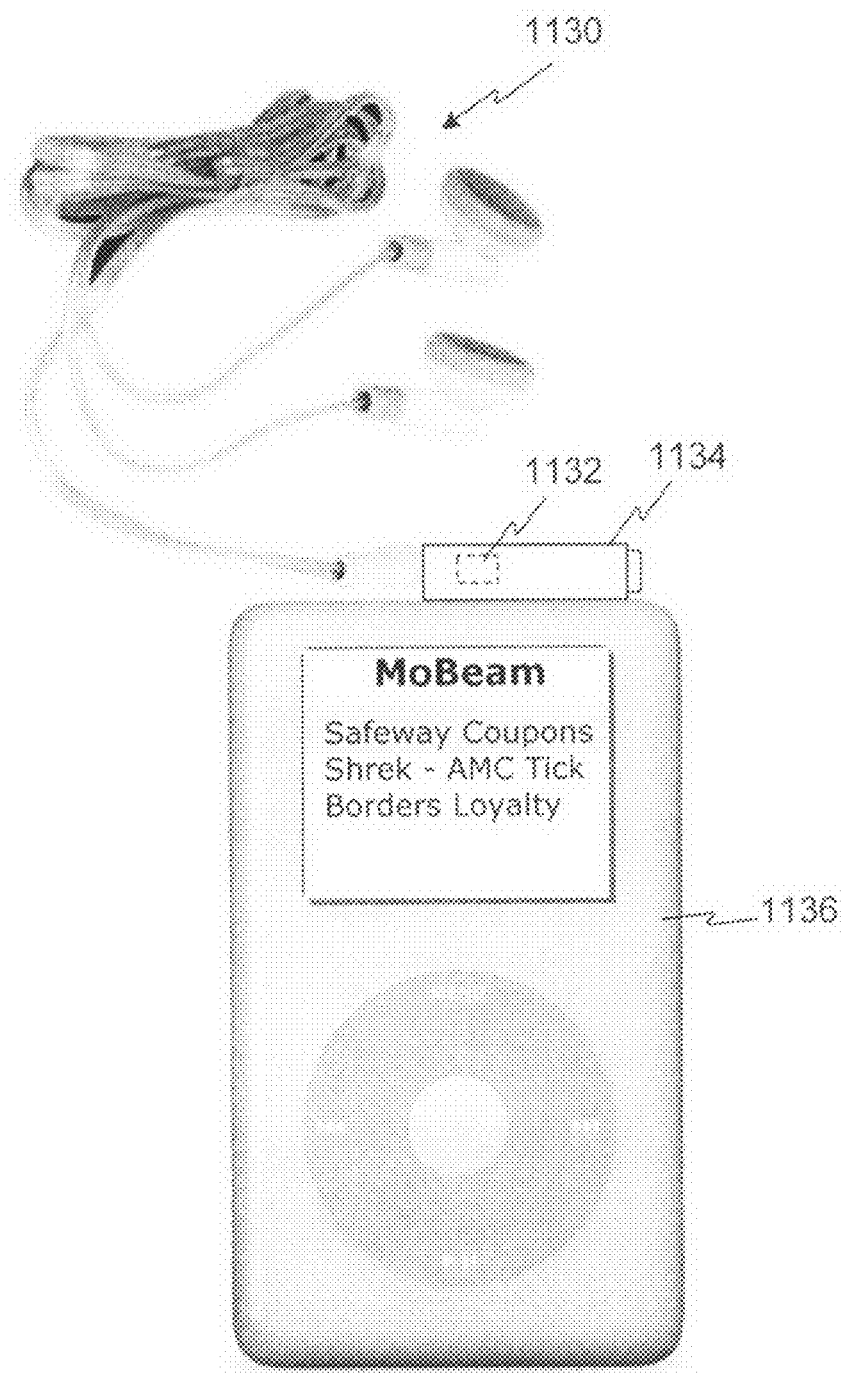
FIG. 28 is a front plan view of an iPod player into which an audio plug style accessory having pass-through is inserted.

FIG. 28 shows an accessory 1134, a variation of the accessory 1110, plugged into a personal electronic device, illustratively an iPod player 1136. The accessory 1134 includes a pass-through so that headphones 1130 may be plugged into the accessory 1134 and used with the personal electronic device even while the accessory 1134 is being used to communicate encoded information from the personal electronic device to a bar code scanner.

The accessory 1134 converts the data-containing signal that is supplied to it into a simulated signal to drive LED 1132 mounted therein. The data containing signal may be furnished by itself, or may be integrated into other content from which it can be detected and converted. In an illustrative application, the data-containing signal is imbedded into a song or narrated message that may be played at check-out to communicate the coupon as bar code information to a bar code scanner with light. In the illustrative application shown in FIG. 28, the user selects the coupons of interest from a MoBeam™ "Offers Playlist," whereupon the coupons are flashed to the bar code scanner by the LED 1132. The light flashes may be timed to the beat, if desired.

Figure 29:
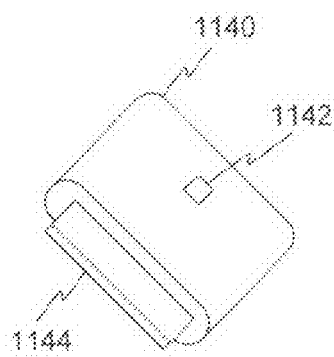
FIG. 29 is a perspective view of a port connector for an iPod player.
Figure 30:
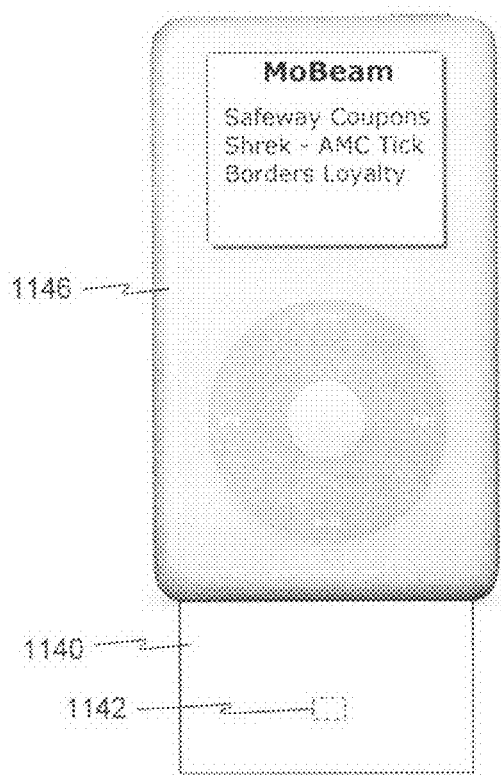
FIG. 30 is a front plan view of an iPod player into which the port connector of FIG. 29 is inserted.

Some types of personal electronic devices include multi-purpose connectors, including proprietary connectors and standard connectors such as the universal serial bus or "USB," which can also be used to drive an accessory for communicating information to a bar code scanner with light. Multipurpose connectors are common on mobile phones and audio and video players. The iPod player, for example, has a proprietary dock interface which includes pins for Power, Ground, Line Out, Line In, Composite Video Out, S-Video Out, Serial Out, USB Data, Firewire Data, and Accessory Indicator. While the Line Out right and left channel pins may easily be used to drive the LED with a suitable simulated audio signal, some of the other pins may be used with the appropriate signaling conventions if the accessory is provided with suitably processing circuitry. FIG. 29 shows an accessory suitable for plugging into the dock interface, while FIG. 30 shows the accessory 1140 plugged into an iPod player 1146. The accessory 1140 includes one or more light sources, illustratively LED 1142, and a connector 1144. Other functions may be integrated into a common housing with the accessory if desired, including voice recorder, radio tuner, an extended battery, FM transmitter, camera, and so forth. The accessory may also be combined with other accessories, such as lanyard headphones (not shown).

Figure 31:
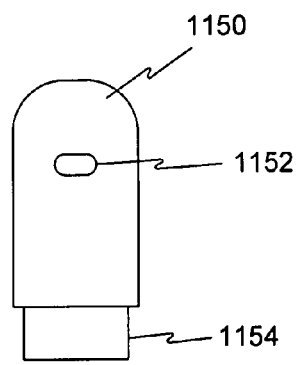
FIG. 31 is a side plan view of an accessory that has a mini-USB style connector.
Figure 32:
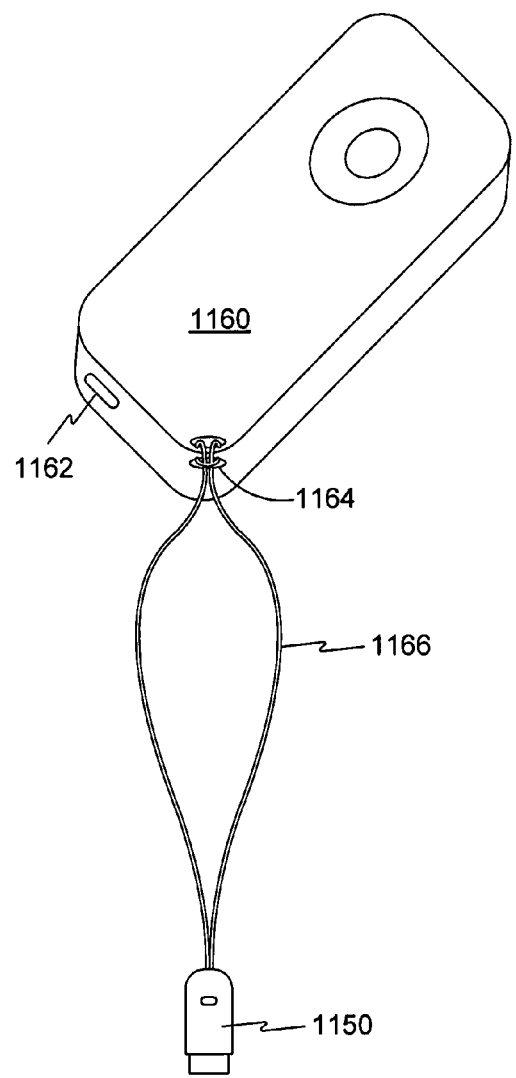
FIG. 32 is a front plan view of an iPod player into which the mini-USB style connector of FIG. 31 is inserted.

FIG. 31 shows an accessory 1150 in the form of a medallion or fob, which has a LED 1152 and which has illustratively has a USB type mini-plug 1154 for use with a mini-USB type multipurpose connector. FIG. 32 shows a personal electronic device, illustratively a model 8525 3G UMTS/HSDPA Pocket PC 1160 available from AT&T Inc. of San Antonio, Tex., USA, which has a sync connector/stereo headset connector 1162 for a USB sync cable, charger cable, or USB stereo headset. Illustratively, the accessory 1150 is combined with a handstrap 1166, which is attached to a strap attachment ring 1164 on the Pocket PC 1160. Alternatively, the accessory 1150 may be provided with a lanyard (not shown) that may be attached to the strap attachment ring 1164.

Figure 33:
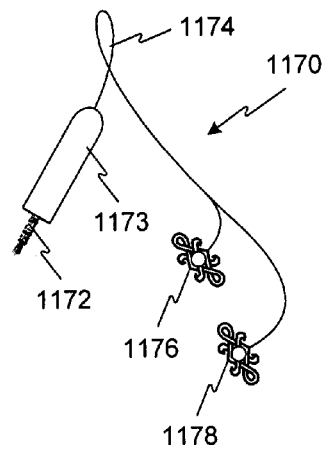
FIG. 33 is a side plan view of an accessory that is in the form of a tassel cell phone charm.
Figure 34:
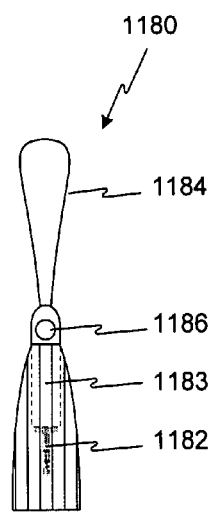
FIG. 34 is a side plan view of an accessory that is in the form of a tassel ornament.
Figure 35:
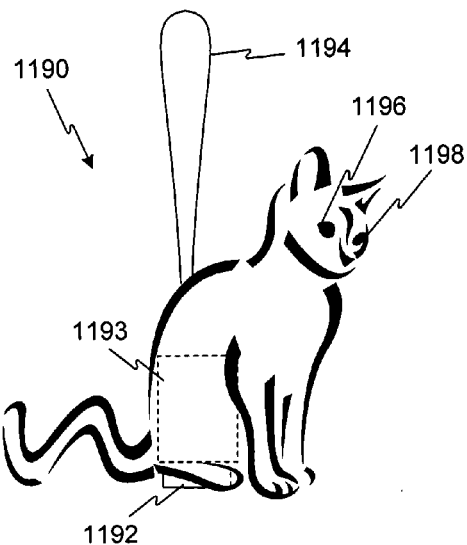
FIG. 35 is a side plan view of an accessory that is in the form of a tassel cat ornament.

An accessory may be integrated into many other items that are commonly used in conjunction with personal electronic devices, including ornamental items. FIG. 33 shows an illustrative tassel cell phone charm 1170, which has a conventional 2.5 mm or 3.5 mm audio plug 1172, casing 1173 containing power and electronics, conductive attachment cord 1174, and two LEDs 1176 and 1178. FIG. 34 shows an illustrative tassel ornament 1180 which has a conventional 2.5 mm or 3.5 mm audio plug 1182, casing 1183 containing power and electronics and set within the tassels, attachment cord 1174, and a LED 1186. FIG. 35 shows an illustrative tassel cat ornament 1190 which has a USB type connector 1192, casing 1193 containing power and electronics and set with the ornament body, attachment cord 1194, and two LEDs 1196 and 1198.

Accessory Suitable for Stand-Alone Operation

Figure 14:
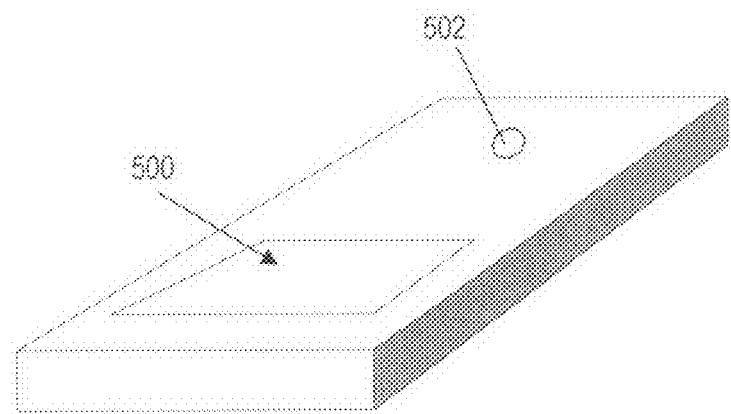
FIG. 14 is a top perspective view of a credit card type accessory in accordance with an aspect of the present invention.
Figure 15:
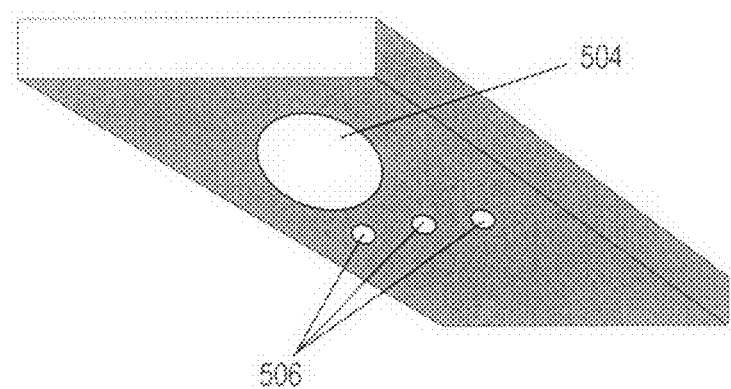
FIG. 15 is a bottom perspective view of the credit card type accessory of FIG. 13.

FIGS. 14 and 15 are top and bottom perspective views of an accessory suitable for stand-alone operation. Illustratively having a length and width of about the size of a credit card and being as thick as or perhaps a little thicker than a credit card, the accessory is provided with at least one LED, illustratively LED 502 situated on one major surface of the accessory, and one or more optical apertures 506 and one or more sound apertures 504 illustratively situated on the other major surface. The accessory also contains a suitable power source, illustrative a battery or an array of photovoltaic cells, and suitable circuitry such as the circuit of FIG. 1. Illustratively, the stand-alone accessory is not provided with any mechanism for attaching to a personal electronic device, but instead is simply brought into proximity with the personal electronic device so that a data-containing signal from the personal device may be received by the accessory generally in the manner described above. In the accessory shown in FIG. 15, for example, the credit-card style accessory may simply be laid over the screen and speaker of a personal electronic device, and any data communicated by the screen or speaker or by both the screen and speaker may be detected and processed. To accommodate various speaker placements, the accessory of FIG. 15 illustratively has three sound apertures 506; a greater or fewer number may be used as desired. The received data is converted to a simulated signal, which may drive a suitable light such as the LED 502 for communicating the data to a bar code scanner.

While the accessory may be used in close association with the personal electronic device in the manner described with respect to the attachable accessory, the credit-card style accessory is particularly suitable for stand-alone use. The credit-card style accessory may be provided with a control pad 500 that may be used to activate the accessory to communicate stored data as bar code information with light from the LED 502. The control pad 500 may be provided with very simple controls, illustratively just an on/off switch, or may have many switches or a combination switch to allow the user to select different types of stored data to communicate with light. In another variation, the credit-card style accessory may be provided with its own screen (not shown), so that the user may preview and select the type of information to be communicated with light. The screen may be used instead of an LED to communicate the information with light to the bar code scanner.

Figures 16, 17:
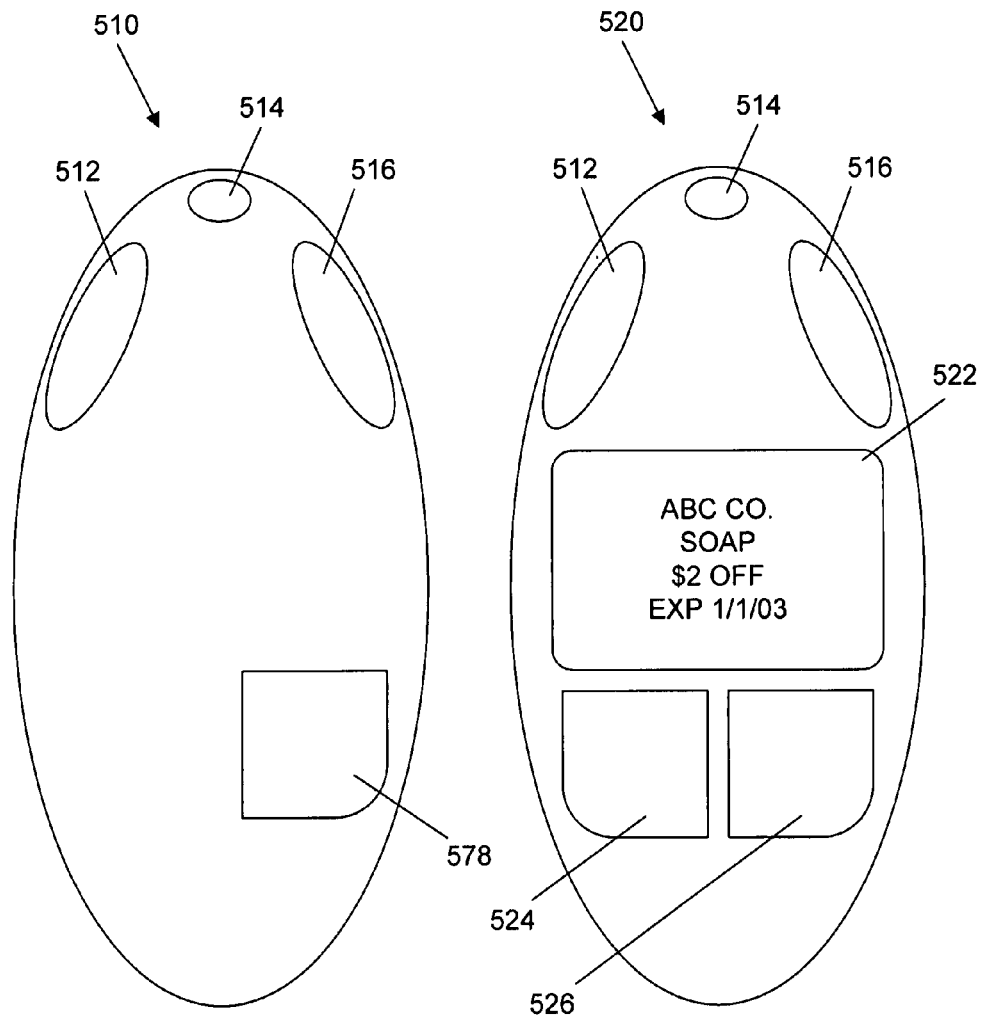
FIG. 16 is a top plan view of a fob accessory in accordance with an aspect of the present invention.
FIG. 17 is a top plan view of another fob accessory in accordance with an aspect of the present invention.

FIGS. 16 and 17 show a form of accessory known as a fob that is particularly suitable for stand-alone use. The specific type of fobs shown is a key fob such as disclosed more fully in U.S. Pat. No. 6,877,665 issued Apr. 12, 2005 to Challa et al. and entitled "System, method, and apparatus for communicating information encoded in a light-based signal using a FOB device," which hereby is incorporated herein in its entirety by reference thereto. The key fobs of FIGS. 16 and 17 are provided with detectors for receiving the data-containing signal from the personal device, as well as the capability of converting the data-containing signal to a simulated signal, and driving a suitable light with the simulated signal for communicating the data to a bar code scanner with light that simulates a reflection of a scanning beam being moved across a static bar code image.

The fob 510 of FIG. 16 not only provides for transmission of data to a bar code scanner but also provides for reception of data through either a light port 512, a sound port 516, or both. An infrared transceiver 514 includes a transmitter component and a receiver component for transmitting and receiving data in one or more communication protocols, including bar code format for use with a bar code scanner. Optionally, other communications protocols such as IrDA for an infrared transceiver may be supported. An activation component 578 may be provided if desired.

The fob 520 of FIG. 17 not only provides for transmission of data to a bar code scanner but also provides for reception of data through either a light port 512, a sound port 516, or both. The fob 520 includes a small display screen 522 and a small key pad having one or more keys such as keys 524 and 526. The display screen 522 may be used to display representative information or to identify particular transmission information data to a user. One of the keys of the key pad may be used to scroll through individual data codes to find the particular transmission information data that the user wishes to transmit to a particular bar code scanner. Thus, the fob device 520 may store multiple different pieces of information, such as coupons, admission tickets, credit card information, and so forth, which may be selected and transmitted to one or more bar code scanners at different times, as desired by the user. The display screen 522 may also, or alternatively, be used to display static visual image of a bar code or other representative image. The display screen 522 may be used to display a short bar code for communicating conventionally with a bar code scanner. Further, a high resolution display, for example, may be used to display a high density representative image, such as, but not limited to a two-dimensional bar code. The high density image may be read by a scanner, such as a charge coupled device (CCD) scanner. In this manner, the fob device 520 may be able to communicate with a light-based data receiving device by actively transmitting the signal as light pulses in a first mode, and/or with another device, such as, but not limited to, a CCD scanner in a second mode.

Although the ornamental items 1170 (FIG. 33), 1180 (FIG. 34) and 1190 (FIG. 35) are all shown with mechanical electrical connectors, it will be appreciated that other techniques described herein may be used in lieu of the mechanical electrical connectors so that ornamental items may operate in a stand-alone manner.

Integration with Other Data Communication Techniques

The accessory for communicating bar code information with light may be used with personal electronic devices equipped with other technologies for communicating data at points-of-sale. Such a combination is particularly useful when the newer technologies such as Near Field Communications ("NFC") technology and Radio Frequency Identification ("RFID") may not be as widely implemented as bar code scanners. One example particular applicable to mobile phones is to combine NFC technology with technology for communicating bar code information with light, so that the mobile phone may still be used in transactions at points of sale that are equipped with bar code scanners, even if lacking the more advanced but not widely adopted NFC technology.

Mobile phones that incorporate NFC technology and run NFC applications are well known in the art. At a point of sale, for example, the user may select a coupon by running an application on her mobile phone. In response to the selection, the NFC technology in the mobile phone communicates the coupon to an NFC terminal at the point of sale. Similarly, a user may select a payment application and effect a payment, in response to which the NFC technology in the mobile phone communicates the purchase to the NFC terminal. NFC protocols are well know in the art.

If a mobile phone is equipped only with NFC technology, the user is likely to be frequently inconvenienced at points of sale until NFC technology is widely adopted. To address this problem, an accessory may be used with the NFC-equipped mobile phone to provide the user the ability to communicate bar code information to a bar code scanner with light at a point of sale in the event that the NFC technology is not available at the point of sale. Detecting no NFC terminal, the mobile phone may default to light communication from an accessory to a bar code scanner for completing the transaction at the point of sale.

If a mobile phone lacks NFC technology, the NFC capability may be provided by a separate accessory, either an attachable accessory such as a sticky button or a stand-alone accessory in a credit card or fob form factor, to provide the user with the capability of conducting transactions with NFC technology.

Figure 18:
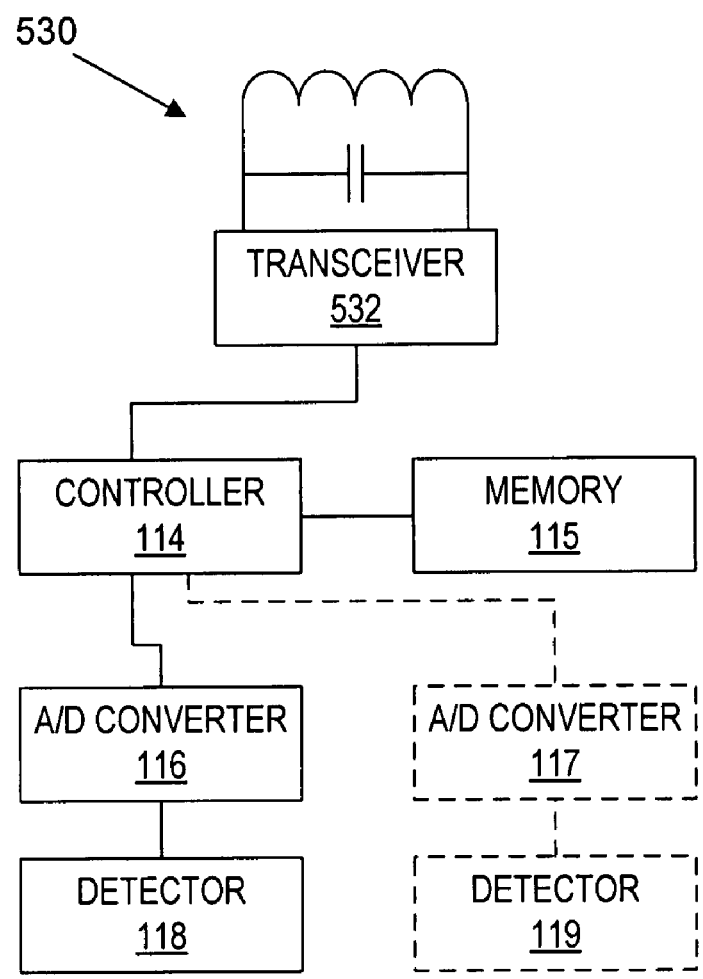
FIG. 18 is a schematic block diagram of a circuit suitable for an accessory that incorporates NFC technology in accordance with an aspect of the present invention.

An example of a suitable circuit for an NFC accessory is shown in FIG. 18. As in the circuit of FIG. 1, the detector 118, illustratively a photodiode, microphone, vibration detector, RF receiver, or other suitable type of detector, monitors for a signal from the personal electronic device. The received signal is converted into digital form in the A/D converter 116, and supplied to an input port of the controller 114. The controller 114 monitors the input port for bit patterns representing encoded data, data markers, commands, and so forth, and executes the appropriate action. Where the data on the input port corresponds to encoded data to be communicated using NFC protocols, the controller 114 processes the data using the memory 115 as necessary to generate the appropriate signal, and applies the signal from an output port to a transceiver 532, which in turns drives the NFC radiator 530, which illustratively is a inductor and capacitor circuit.

Figure 19:
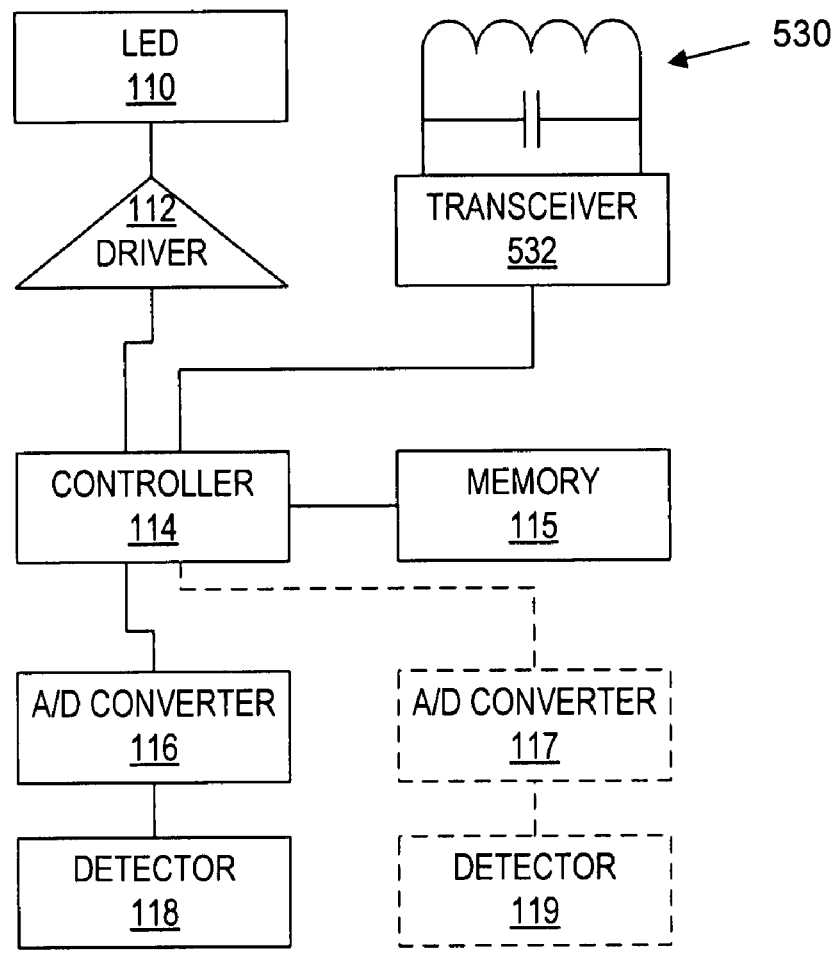
FIG. 19 is a schematic block diagram of a circuit suitable for an accessory that incorporates both light technology and NFC technology in accordance with an aspect of the present invention.

FIG. 19 shows a circuit that is capable of communicating information using NFC technology or as bar code information to a bar code scanner with light, and is particularly suitable for current and earlier generation phones. The circuit of FIG. 19 includes components from the circuit of FIG. 1 and FIG. 18, and in addition preferably is programmed with the capability of automatically selecting NFC if available, and otherwise using light communication to a bar code scanner. The availability of both technologies in one accessory provides an agreeable and nearly seamless experience to the user for a wide variety of transactions, including mobile payment transactions as well as ticket and coupon redemption.

Basic Technique for Communicating Bar Code Information with Light

Figure 20:
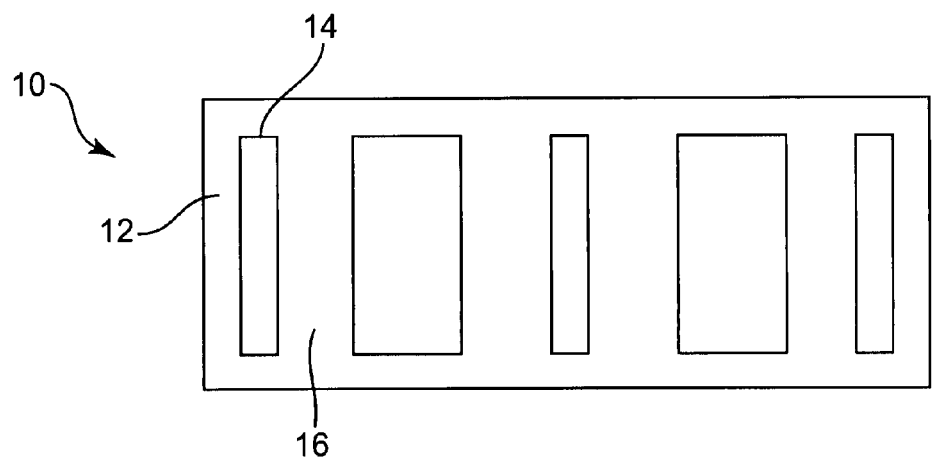
FIG. 20 is a plan view of an illustrative one-dimensional bar code.

FIG. 20 shows a bar code 10 that utilizes a series of vertical lines, i.e., bars 14, and spaces 16 to represent an identification code. Different combinations of the bars and spaces may be used to represent different characters.

Conventional bar code scanners include sequential bar code scanners and charge-coupled device ("CCD") bar code scanners. One type of sequential bar code scanner uses a scanning beam, typically narrow band light in the visible spectrum such as red laser, but potentially any bandwidth of light in the visible or infrared spectra, to pass over a sequence of bars and spaces such as bar 14 and space 16 sequentially, e.g., left to right and/or right to left. Another type of sequential scanner is a wand scanner, which is swept across the bar code by a user to create the scanning beam. As the scanning beam of light scans across the bar code 10, the beam is at least partially reflected back to the scanner by the spaces 16 and is at least partially absorbed by the dark bars 14. A receiver, such as is a photocell detector, in the bar code scanner receives the reflected beam and converts the beam into an electrical signal. As the beam scans across the bar code, the scanner typically creates a low electrical signal for the spaces 16, i.e., reflected beam, and a high electrical signal for the bars 14, i.e., where the beam is absorbed. However, the scanner may create a low electrical signal for the bars 14 and a high electrical signal for the spaces 16 if desired. The width of the elements determines the duration of the electrical signal. This signal is decoded by the scanner or by an external processor into the identification code that the bar code represents.

The CCD type scanner takes a digital image of the bar code, and decodes the digital image using software that is well known in the art to convert the elements into the identification code.

While a bar code may be displayed on the screen of a personal electronic device, many of these screens are not suitable for this purpose. In the sequential-type scanners and the CCD-type scanners, the contrast between the bar and space elements is used to distinguish the elements and decode the bar code. However, the screens of many types of personal electronic devices, such as the LCD screen of a PDA or a cell phone, for example, tend to have low contrast between the gray "off" state designating a space of the bar code and the black "on" state designating a bar, relative to the contrast that is present in a bar code printed on a black-and-white label. This lower contrast between the elements of the bar code displayed on a screen can result in a lower reliability of the decoding process. Moreover, many types of personal electronic devices have extremely small screens or no screens at all.

U.S. Pat. No. 6,685,093 issued Feb. 3, 2004 to Challa et al. and entitled "System, method and apparatus for communicating information between a mobile communications device and a bar code reader," which hereby is incorporated herein in its entirety by reference thereto, describes a variety of techniques for effectively communicating information between a mobile communications device and a bar code reader.

Figure 21:
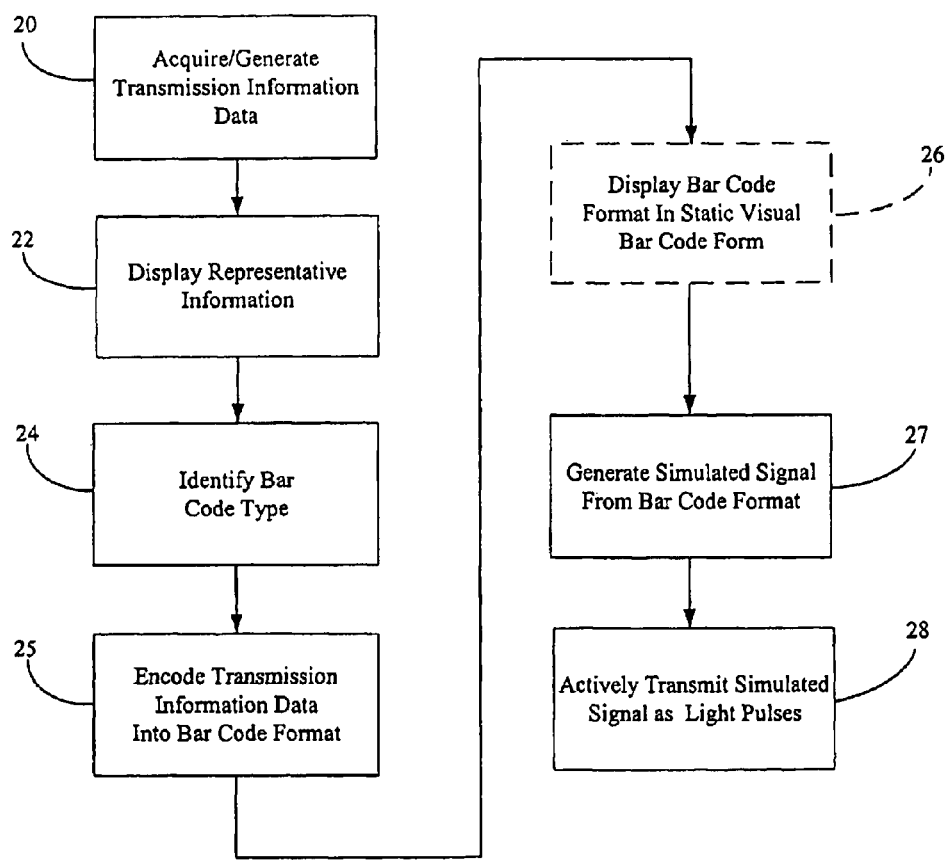
FIG. 21 is a flow chart of a method of actively providing transmission information data to a bar code scanner.

FIG. 21 shows a method of generating a signal for use with a sequential bar code scanner that simulates a bar code with light pulses. The method of FIG. 21 is particularly useful for sequential bar code scanners that use the reflection of a scanning beam being moved over a bar code. In block 20, transmission information data is acquired or generated. The transmission information data may be any type of data that one may wish to communicate while at a facility equipped with a bar code scanner, including information conventionally communicated using bar codes, as well as other types of information that are not conventionally communicated using bar codes because of, for example, physical limitations imposed by the bar code format. The transmission information data, for example, may include numeric, alphabetic, or alphanumeric data, an index, or other data values. The transmission information data may represent, for example, identification codes, boarding pass information, e-ticket information, ticket information, credit card information, debit card information, automated teller machine card information, identification information, account information, electronic payment information, wire transfer information, purchase information, security information, affinity information, and so forth.

The transmission information data may be stored locally on the personal electronic device, such as in random access memory ("RAM") or read only memory ("ROM"), or acquired from a remote source. The personal electronic device may include, for example, static or dynamic RAM ("SRAM" or "DRAM," respectively) memory, FLASH memory, other types of memory known in the art, or indeed any other type of memory. The transmission information data may be programmed into the device, entered into the device by the user, or received by the device from a remote source over any known communication technology such as wireless transmission, universal serial bus ("USB") transmission, parallel transmission, and serial transmission. The remote source may be a personal computer, a wireless operator, a server networked to the wireless operator, a peer networked to the wireless operator, a wireless data port, and so forth.

In block 22, representative information for the transmission information data that will identify the transmission information data to a user of the personal electronic device is presented on an output facility of the device. The output facility may include, for example, a display such as an LCD screen of a PDA or wireless telephone, a speaker, or any other output device for communicating with a user. The representative information may include the transmission information data itself, or may be other information that the user will associate with the transmission information data. In order to identify the desired transmission information data item, the representative information that will identify that transmission information data item may be rendered, for example, in a textual, numerical, and/or graphical form and displayed on a screen of a suitably equipped personal electronic device, or an audio, video or multimedia message that is played by a suitably equipped personal electronic device. Boarding pass information may be displayed on a screen of a mobile phone, for example, identifying the airline, the flight and seat numbers, the date and departure time of the flight, and the gate number. In this manner, the user of the personal electronic device can identify the transmission information data that is to be presented, is being presented, or has been presented to the bar code scanner. If multiple transmission information data items are stored locally on the device and/or remotely retrieved, for example, the user can scan through them and select the appropriate transmission information data item to be presented to the bar code scanner.

If the personal electronic device lacks a screen or if the screen is too small, the representative information may be presented in other ways, such as by a spoken message or patterns of tones. Alternatively, the representative information need not be displayed.

In block 24, a bar code type is identified. The bar code type may be any type of barcode known in the art, such as, but not limited to, a UPC, EAN, Interleaved 2 of 5, Code 93, Code 128, and Code 39, or specially designed bar code types.

In block 25, the transmission information data is encoded into a bar code format for the identified bar code type. The bar code format may be represented, for example, by a binary array. In a typical single-dimensional barcode, for example, the smallest width of a bar or space element of a bar code may be designated as a single element of an array. If the bar code has a width of 256 dots or pixels, and the smallest element of the bar code has a width of 4 dots or pixels, for example, a binary array having sixty four array elements (e.g., $a1$, $a2$, . . . , $a64$) may be used to represent the bar code format. Each array element is assigned a value depending on whether that portion of the bar code is part of a bar or a space. A bar, for example, may be designated as having a value equal to one (e.g., $a1=1$), and a space maybe designated as having a value equal to zero (e.g., $a32=0$). The array may also alternatively be a two-dimensional array, such as a bit map, that may be easily displayed on a screen. In yet another example, the transmission information data may be encoded into a digital series corresponding to a bar code representation of the bar code type selected in block 24. Alternatively, the transmission information data may be encoded into any number of other formats that may correspond to the selected bar code type identified in block 24. The bar code format may also be compressed or encrypted, such as when the bar code format is to be transmitted from a remote source to the personal electronic device.

Optionally, the transmission information data may be displayed in static visual bar code form as shown in block 26. In this manner, a personal electronic device can provide the transmission information date as a static visual bar code, which may be readable by CCD scanners and some types of sequential bar code scanners. Other visual information may be displayed as well, such as, for example, a visual image of a product corresponding to the transmission information.

In block 27, a signal to simulate the reflection of a scanning beam being moved across a visual image of the bar code format of block 25 is generated from the bar code format. The simulated signal may be generated corresponding to an approximated or measured scanning rate. If the simulated signal is to be generated for a scanner such as a laser scanner that utilizes a scanning rate in the range of about 30 to about 60 scans per second, the simulated signal may be generated using a scan rate within that range of scan rates (e.g., about 45 scans per second). Other types of scanners such as supermarket scanners are much faster, scanning at a rate of about 3000 to about 6000 scans per second. The simulation signal should be generated using a scan rate within that range. Alternatively, the simulated signal may be generated using a variable scan rate that is swept throughout a range of scan rates. Alternatively, as described below with respect to an exemplary infrared transmitter/receiver pair, the scan rate of the scanning beam may be measured where a receiver is available to detect the scanning beam. In this case, once the scanning rate or rates are determined, the signal is generated in block 27 corresponding to this scan rate or rates.

In block 28, the simulated signal is transmitted as light pulses. For purposes of the present description, the term "light" refers to visible light and infrared light spectra. The term "pulse" refers merely to a change in light level; the characteristics of the change, i.e. the specific waveform shape, are not critical. The light pulses may be generated in any visible or infrared wavelength desired by any light source known in the art, such as an LED, a laser, an infrared transmitter, a backlight of an LCD screen, or a light bulb.

Figure 22:
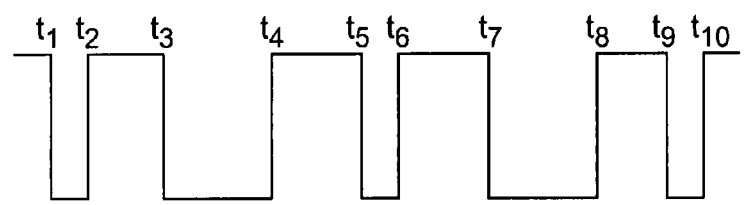
FIG. 22 is a graph of a characteristic of a signal representing the bar code of FIG. 20 against time.

FIG. 22 shows an idealized representation of a signal that may be generated in block 27 of FIG. 21 for actual transmission as light pulses in block 28, by which is created light corresponding to the reflection of a scanning beam off bar code 10 (FIG. 20). The one-dimensional bar code 10 includes a quiet zone 12, bars 14, and spaces 16. While FIG. 20 shows a quiet zone 12 being lighter, the quiet zone may alternatively be darker if the scanner is adapted to recognize it. Correspondingly, the bars 14 and the spaces 16 may be inverted such that the bars 14 are lighter than the spaces 16. As a scanning beam scans across the quiet zone 12 and the spaces 16, the beam is reflected to the scanner. As the beam scans across the bars 14, however, the beam is absorbed (or at least the reflected beam has a lower amplitude than the beam reflected from the lighter quiet zone 12 and spaces 16). Thus, the amplitude of the beam received at the scanner decreases at times t1, t3, t5, t7, and t9, which correspond to the beam reaching a leading edge of a bar 14, and increases at time t2, t4, t6, t8, and t10, which correspond to the beam reaching the falling edge of a bar 14.

Transmission information data encoded in a bar code format may be actively provided to a sequential bar code scanner by providing a light-based representation of a signal, such as shown in FIG. 22, to a scanner, instead of providing a potentially less reliable static bar code image to the scanner. Since many bar code scanner receivers will receive visual wavelength signals, personal electronic devices that have components that operate at these wavelengths can be used to provide an active light representation of the simulated reflected scanning beam to a sequential bar code scanner. The transmission information data may thus be actively provided to current or improved sequential bar code scanners without the requirement of altering the existing bar code scanner infrastructure.

When the bar code scanner receives the beam, the scanner decodes the on/off sequence of the beam to determine the transmission information data being provided, in a manner known in the art.

Sequentially providing such a signal to a sequential bar code scanner further allows for the transmission of bar code information without regard to the physical size and/or resolution limitations of the device display. A bar code representation that might otherwise require an unreasonably wide screen to convey all the information to the scanner, for example, may be provided directly to the scanner in one step from even the narrowest of screens.

Figure 23:
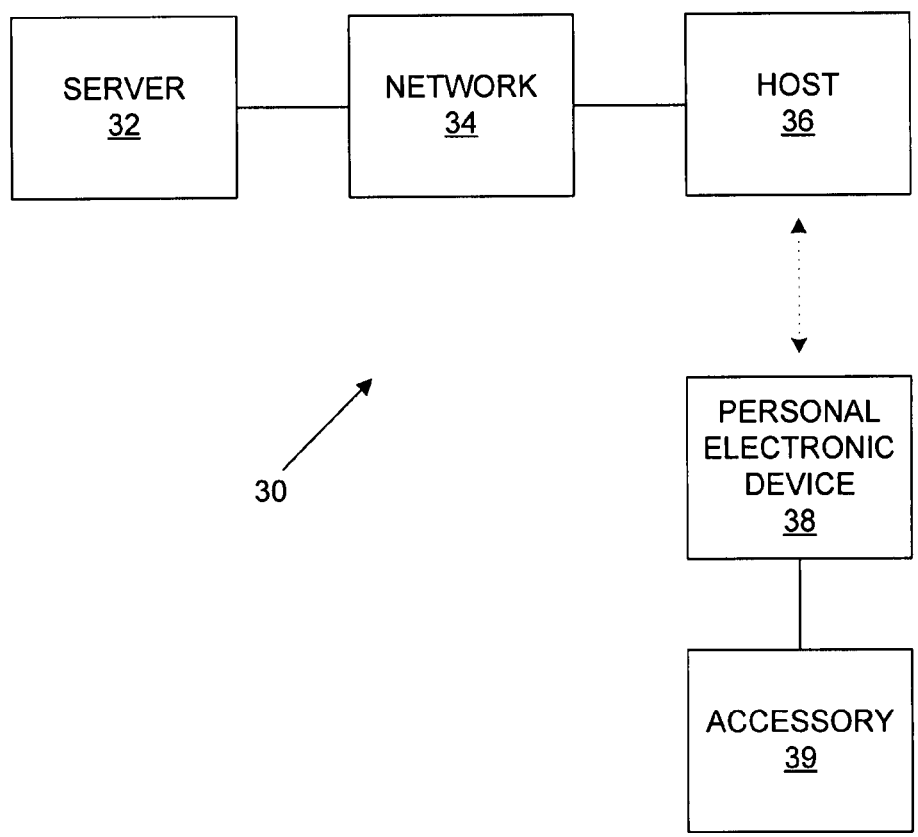
FIG. 23 is a schematic block diagram of a system for providing transmission information data to a bar code scanner from a personal electronic device.

FIG. 23 shows a schematic representation of one implementation of a system 30 for providing transmission information data to a bar code scanner from a personal electronic device. Server 32 is connected to a host 36 via a network 34, such as a local area network ("LAN"), a wide area network ("WAN"), an intranet, an extranet, the Internet, or other known network. The host 36, in turn, is connected to the personal electronic device 38, such as through wireless technology, cellular technology, phone line, dedicated service line ("DSL"), cable connection, or other known remote access technology. In one approach, for example, the server 32 may maintain a database of transmission information data items that are transmitted to the personal electronic device 38 via the host 36. A user of the personal electronic device may remotely select one or more transmission information data items, or the server 32 may provide a transmission information data item that has been selected for the user of the personal electronic device 38 either by the server 32 or some other system and communicated to the server, such as via the network 34. The server 32 retrieves the one or more transmission information data items from the database and provides the transmission information data to the personal electronic device 38 via host 36. In this approach, the personal electronic device 38 receives the transmission information data in block 20 (FIG. 21), and together with an accessory 39 and depending on the particular communication protocol elected, performs the remaining operations depicted in blocks 22, 24, 25, 27, and 28.

Alternatively, some or all of the processing shown in blocks 20, 22, 24, 25, and 27 may be performed upstream of the personal electronic device 38, such as at server 32, at host 36, or at an intermediate location such as a component of network 34. For example, the server 32 may retrieve a transmission information data from a database, either on its own or in response to a request from the user of the personal electronic device 38, identify a bar code type (block 24), encode the transmission information data into a bar code format such as the array described above (block 25), and transmit the bar code format to the personal electronic, device 38. If the personal electronic device 38 does not already have representative information to display on the screen of the device 38 (block 22), the server 32 may also provide this information to the personal electronic device 38. Information provided to the personal electronic device 38 may be encrypted and/or compressed as known in the art.

The accessory 39 includes visible light sources such as light emitting diodes ("LEDs") that may be used to present bar code information to a sequential bar code scanner. The LEDs may be alternated between on and off or between relatively bright and relatively dark settings in accordance with the simulated signal to simulate the movement of the reflection of a scanning beam across a conventional bar code. Thus, the LEDs may be set to their brightest setting for a duration corresponding to the time period during which the simulated scanning beam would transition from the falling edge to the leading edge of a bar, and to their darkest setting for the duration corresponding to the time period during which the simulated scanning beam would transition from the leading edge to the falling edge of a bar. If the light source is capable of emitting different colors such as red and blue, the light source may be alternated between different colors to simulate a reflection from a visual image of the bar code format.

Alternatively, the accessory 39 may include an infrared ("IR") transmitter/receiver pair that is typically used in personal electronic devices to exchange digital information. In one approach, the accessory 39 selects a scan rate for the scanning beam, calculates a signal that corresponds to the reflection of a simulated scanning beam moving across a bar code image at that scan rate, and transmits that signal via the transmitter of the IR transmitter/receiver pair to the scanner.

Figure 24:
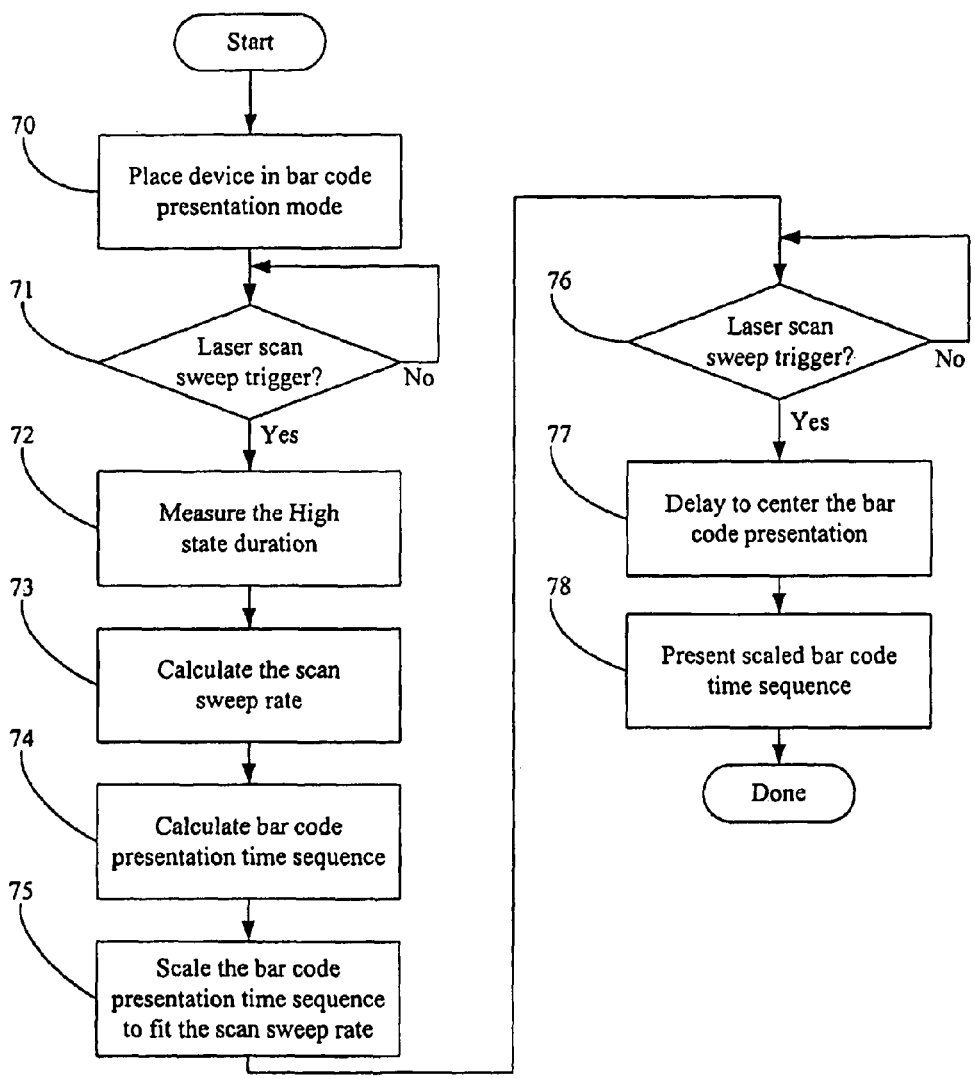
FIG. 24 is a flow chart of a method of synchronizing an active presentation of transmission information data to a scan sweep of a bar code scanner.

In an alternative approach, the receiver of the pair may be used to detect the scan rate of a sequential bar code scanner beam over one or more scan cycles. The accessory 39 may then calculate the scan rate of the beam and synchronize its transmission of a simulated reflected scanning beam to the scanner. If no beam is detected, a default scan rate may be used. As shown in the illustrative method of FIG. 24, if the IR transmitter/receiver pair is not dedicated to the presentation of bar code information for the personal electronic device and the device cannot distinguish the scanning beam from other IR transmissions, the accessory 39 is placed in a bar code presentation mode in block 70. In this mode, when a scanning beam of a bar code scanner is detected in block 71 at the receiver of the IR transmitter/receiver pair, an interrupt trigger is generated indicating the start of the sequential scanner beam sweep. If a signal at a pin of the processor is normally low (logical state) when no signal is detected and high when a signal is detected at the receiver, the processor monitors the receiver and determines the duration that the pin stays at the high logical state in block 72. This time corresponds to one scanner sweep. The processor can determine the scan rate from the duration of one scan sweep in block 73. For example, a scan sweep of about 33 milliseconds corresponds to a scan rate of about 30 scans per second and a scan sweep of about 10 milliseconds corresponds to a scan rate of about 100 scans per second. The processor also calculates the time sequence of the scan sweep that corresponds to the leading and ending quiet zones 12, and the bar code data zone in block 74. This time sequence is scaled for presenting the simulated reflected scanning beam to the scanner in one scan sweep in block 75. When another incoming trigger is detected corresponding to the start of a new scan sweep in block 76, the processor delays the start of block 78 to center the presentation of bar code data in the scan sweep of the scanner, and the simulated reflection of the scanning beam corresponding to the bar code is transmitted via the IR transmitter of the IR transmitter/receiver pair 62 in block 78.

If the accessory 39 includes a display, the display may be used to present transmission information data to a sequential bar code scanner in accordance with the techniques described herein. The display may be alternated between on and off, or between relatively bright and relatively dark settings, or between different colors such as red and blue, to simulate the movement of a scanning beam across a conventional bat code. Thus, the display or at least a significant part thereof may be set to its brightest setting for a duration corresponding to the time period during which the simulated scanning beam would transition from the following edge to the leading edge of a bar, and to its darkest setting for the duration corresponding to the time period during which the simulated scanning beam would transition from the leading edge to the following edge of a bar. Alternatively, any aspect of the display that may be changed and recognized by a bar code scanner receiver may be utilized. A display backlight, for example, may be turned on and off, or brightened and dimmed, to provide the simulated scanning beam signal to the receiver. In some instances, combining the techniques may be most effective. For example, reflected light may be simulated by a white screen with a backlight on, while absorbed light may be simulated by a dark screen with a backlight off.

The amplitude of the driving signal may also be adjusted to account for distance between the presenter and the scanner location. If the scanner is further away, the amplitude may be increased to ensure a higher probability of a successful scan. In one illustrative procedure, the accessory initially presents the barcode beam at a low amplitude while monitoring for a "success tone" to indicate a successful scan confirmation. If the "success tone" is not received within a prescribed time window, the barcode beam may be presented at higher amplitude. The accessory may be provided with a microphone suitable for use in monitoring for success tones.

The barcode presentation rate depends upon the nature of the scanner that is being used in the particular situation. Typically, supermarket scanners are much faster than handheld scanners to account for factors such as the high speed movements of the item being scanned, lack of precise control on the varying distance between the item and the scanner, and the variety of orientations in which the item being scanned could be presented. In contrast, handheld scanners are usually held close to the stationary item that is being scanned, unless they are being used in a factory/warehouse environment. Accordingly, the type of barcode item being presented may be used to as an indication of whether to allow either high speed barcode presentation or low speed barcode presentation to be selected. If a movie ticket is being presented, the implementation may elect to present the barcode at slower speed more appropriate for handheld scanners. Conversely, if the barcode being presented is a grocery coupon, then the implementation may elect to present the barcode at high speeds that are better aligned to high speed flatbed scanners typically found in supermarkets. After having broadly identified the barcode as requiring either a fast or a slow presentation speed, the actual presentation may sweep a range of presentation speeds to account for the variety of scanners typically used.

Advantageously, the accessory may provide the user with suitable feedback indicative of the current action being performed. The presentation of the barcode, i.e. the flashing of the light source, may be started with the light source being initially either ON or OFF. Flashing the light source during the actual barcode presentation is done at such a high speed that the actual flashing would not be perceived by a user. The user would perceive the light source to be ON initially and during the presentation if the light source is ON at starting. This would indicate to the user and others in proximity that the barcode was being actively presented. In instances where a discrete presentation of barcodes would be more appropriate, the presentation may be initiated with the light source to be OFF initially. Whereas the user is aware of the presentation, others in the proximity would have no indication that the barcode was being presented.

Although the barcode presentation is typically done at speed so high as not to be directly perceived by the user, the amplitude of the light source may be modulated in a suitable manner in the interest of providing feedback to the user. The amplitude could be varied between the minimum amplitude required by the ambient light conditions and maximum available to create the impression of a flickering that is indicative of an ongoing barcode presentation.

Another approach to providing feedback to the user during an active barcode presentation is to provide the accessory with a "vibration mode" such as typically found on mobile phones, and enable the vibration mode during an active barcode presentation.

The various types and configurations of accessories described herein are suitable for use with a great many different types of personal electronic devices, which include mobile communications devices, both of the type that are well known and commercially available today, as well as a myriad of new mobile communications devices that are likely to be introduced. These devices exhibit great variety in their user input capabilities and display capabilities. Examples of mobile communications devices include personal data assistants ("PDAs") operating under such operating systems as the Palm™ operating system and the Windows™ CE and Windows Mobile® operating systems, a SmartPad notepad such as is available from Seiko Instruments of Torrance, Calif., and equipped with a wireless PDA device, two-way pagers, some types of consumer wireless Internet access devices ("CADs") and Internet appliances, GSM phones, WAP-enabled phones, as well as Java™-enabled and BREW®-enabled phones available from various manufacturers such as Nokia of Helsinki, Finland, and Sony-Ericsson Mobile Communications, Inc. of Research Triangle Park, N.C., personal communication system ("PCS") phones, multi-function wireless FOMA phones with the iMODE browser available from NTT Docomo of Tokyo, Japan. Further examples of electronic devices that may be used within the scope of the present invention include a communications-enabled personal data assistant. Many different kinds of communications-enabled PDAs are available. Examples include the various handhelds, mobile managers, and smart phones available from Palm, Inc. of Sunnyvale, Calif.; the pdQ smartphone, which is available from QUALCOMM Incorporated of San Diego, Calif.; and a variety of PDAs suitably equipped with attached wireless modems such as, for example, the Palm III and V connected organizers with Minstrel® Other smart phones include those that support 3G technologies such as GMS UMTS/HSPDA and CDMA EV-DO. Other examples include wireless Palm-top modems and other wireless connectivity products available from Novatel Wireless Inc. of San Diego, Calif. Other examples include devices based on the Windows™ CE and Windows Mobile® operating system such as the various devices available from, for example, Compaq Computer of Houston, Tex., Hewlett Packard of Palo Alto, Calif., Casio Corporation of Tokyo, Japan; and various advanced data-enabled phones powered by the Symbian OS operating system available from Symbian Ltd. Of London, UK. Another illustrative platform is the Wireless Internet Device ("WID"), a type of device that includes the functionality of a phone as well as a PDA, WAP browser, and HTML browser. A family of products with WID capabilities is available from, for example Sony-Ericsson Mobile Communications, Inc. Any suitable wireless technology may be used, including, for example, GSM, CDMA, TDMA, GRPS, and UMTS. Examples of user input capabilities offered by these devices include keypad, keyboard, stylus, ink, handwriting recognition, voice recognition, and so forth.

The accessory described herein may also be used with other types of personal electronic devices, whether or not they are provided with wireless communications capability. Examples of devices that have no or inadequate wireless communications capability include some personal digital assistants; some gaming devices; most audio and video players (including the popular iPod® mobile digital devices available from Apple Computer Corporation of Cupertino, Calif., USA, and the Zen MicroPhoto MP3 player available from Creative Labs Inc. of Milpitas, Calif., USA); most fobs; and USB Flash drives. Many of these devices have the ability to synchronize with or accept data from computers, and this capability may be used to furnish information to the personal electronic device that may later be communicated to the accessory and then in turn communicated in bar code form from the accessory to a bar code scanner. In the context of music downloads, for example, an audio player such as an iPod mobile digital device or a Zen MP3 player may receive a coupon for device accessories or other goods and services during the music download process, and that coupon may be presented while later shopping at a store by using the techniques described herein. Other personal electronic devices have numerous data transfer options. The Playstation® Portable device available from Sony Computer Entertainment America Inc. of Foster City, Calif., USA, for example, has Wi-Fi, USB, memory stick, and infrared I/O capabilities, any one of which may be used to receive a coupon. The Zune™ player available from Microsoft Corporation of Redmond, Wash. USA has Wi-Fi which may be used to receive a coupon.

To further facility the transfer of information and perhaps support other functionality, the accessory may be provided with a capability for detecting when a transfer of information to a bar code scanner is complete. When a scanner completes a scan, it typically emits an audio signal, typically a beep. The beep may be detected by the accessory through the use of a microphone. Microphones and if necessary LEDs may be cheaply and easily added to the accessory.

Confirmation of completion of a scan may be used in many other ways, including, for example, in accordance with the techniques described in U.S. Pat. No. 6,736,322 issued May 18, 2004 to Gobburu et al. and entitled "Method and apparatus for acquiring, maintaining, and using information to be communicated in bar code form with a mobile communications device," which hereby is incorporated herein in its entirety by reference thereto.

Different types of scanners emit different sounds, and the frequency and/or tone or other characteristic of the sound may be used to support additional functionality. An example of such additional functionality is security. Scanners of the type typically used at grocery stores may emit a different frequency and/or tone than the type of scanners used at movie theaters and sporting events, so that a particular frequency and/or tone can be expected based on the type of ticket or coupon or other information being communicated, and confirmation may be requested or the transaction declined if the frequency and/or tone received does not match the anticipated frequency and/or tone. If desired, particular models of scanners may be provided with unique sounds using frequency, tone, cadence, melody, or indeed any other sound characteristics, and the ticket, coupon or other bar code information may require that this particular unique sound be detected by the in order for the transaction to complete.

Acquisition of Information

The accessories described herein may acquire information for communication to a bar code scanner or NFC terminal in a great many different ways. In addition to techniques mentioned elsewhere, the information may be embedded in a jingle, a downloaded video, a video attached to an MMS message, and so forth. A company may, for example, deliver a jingle, ring tone, picture, video or other content to a user. When the user reviews the content on the user's personal electronic device or installs the ring tone, the embedded information is expressed and detected by the accessory. Where the content includes an audio component, for example, sounds embedded in the audio component that represent encoded data are detected by the audio detector of the accessory, and the data is stored for subsequent use. The encoded data may be a coupon which is delivered with an advertisement and which may be communicated by the accessory at a point of sale to a bar code scanner or NFC terminal. The encoded data may be an event ticket delivered with an announcement and which may be communicated by the accessory at the entry gate to a bar code scanner or NFC terminal.

While the accessories described herein are particularly suitable for use with personal electronic devices, they may also be used to monitor the environment in the vicinity of the accessory for encoded information. An attachable accessory and particularly a stand-alone accessory may continuously monitor for encoded information contained in emissions such as sound or light from any active source such as televisions, radios, movies, and kiosks and other point sources. The encoded data may simply be stored by the accessories for subsequent use or management by the user, or may be presented to the user as the encoded information is received. The user may be alerted when encoded information is received, or when encoded information matching user-defined criteria is received.

Management of Data on the Accessory

Under some conditions, an accessory may acquire a large volume of information that must be managed. An accessory may be provided with limited screen and manual control features which a user may operate to manage the information stored in it. Alternatively or in addition, an accessory may be provided with the capability of being managed remotely from a personal computer. A data and control link may be achieved using a wired connection such as USB, or a wireless connection such as Wi-Fi, Bluetooth or Wibree. If the personal computer is provided with an NFC terminal or a bar code scanner, an accessory may communicate to the personal computer using light or NFC, while the personal computer may communicate with the accessory using the detector or detectors built into the accessory, such as sound, light, vibration, and RF detectors. The personal computer may also add data to the accessory, if desired.

The various embodiments of the invention described herein are illustrative of our invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention, as set forth in the following claims.

The invention claimed is:

1. A method of using an accessory to communicate information from a personal electronic device to a bar code scanner, comprising:
   positioning the accessory in proximity to the personal electronic device;
   receiving on the accessory encoded data from the personal electronic device;
   generating in the accessory a signal from the encoded data to simulate a reflection of a scanning beam being moved across a static visual image of a bar code formatted form of the encoded data; and
   transmitting the signal as light pulses from the accessory to the bar code scanner while the accessory is in proximity to the personal electronic device.

2. The method of claim 1 wherein the positioning step comprises removably attaching the accessory to the personal electronic device.

3. The method of claim 2 wherein:
   the accessory comprises an audio plug;
   the personal electronic device comprises an audio jack; and
   the removably attaching step comprises plugging the accessory into the audio jack of the personal electronic device.

4. The method of claim 2 wherein:
   the accessory comprises a multipurpose plug;
   the personal electronic device comprises a multipurpose jack; and
   the removably attaching step comprises plugging the accessory into the multipurpose jack of the personal electronic device.

5. The method of claim 1 further comprising embedding the accessory into a housing component of the personal electronic device.

6. The method of claim 1 wherein the positioning step comprises positioning the accessory in proximity to but physically separate from the personal electronic device.

7. The method of claim 6 wherein the accessory comprises a fob.

8. The method of claim 6 wherein the accessory comprises a credit-card style device.

9. A method of using an accessory to communicate information from a personal electronic device to an NFC a near field communication (NFC) terminal, comprising:
   positioning the accessory in proximity to the personal electronic device;
   receiving on the accessory encoded data from the personal electronic device;
   generating in the accessory an NFC protocol signal from the encoded data; and
   transmitting the signal from the accessory to the NFC terminal while the accessory is in proximity to the personal electronic device.

10. The method of claim 9 wherein the positioning step comprises removably attaching the accessory to the personal electronic device.

11. The method of claim 9 wherein the positioning step comprises positioning the accessory in proximity to but physically separate from the personal electronic device.

12. A method of using an accessory to communicate information from a personal electronic device to a bar code scanner or a near field communication (NFC) terminal, comprising:
   receiving on the accessory encoded data from the personal electronic device;

when communication to an NFC terminal is desired:
    generating in the accessory an NFC protocol signal from the encoded data; and
    transmitting the NFC protocol signal from the accessory to the NFC terminal; and when communication to a bar code scanner is desired:
    generating in the accessory a signal from the encoded data to simulate a reflection of a scanning beam being moved across a static visual image of a bar code formatted form of the encoded data; and
    transmitting the signal as light pulses from the accessory to the bar code scanner.

13. The method of claim 12 further comprising removably attaching the accessory to the personal electronic device, wherein the NFC protocol signal transmitting step and the light pulses transmitting step are performed while the accessory is attached to the personal electronic device.

14. The method of claim 12 further comprising positioning the accessory in proximity to but physically separate from the personal electronic device, wherein the NFC protocol signal transmitting step and the light pulses transmitting step are performed while the accessory is in proximity to the personal electronic device.

15. An accessory for communicating information from a personal electronic device to a bar code scanner, comprising:
- a detector for receiving encoded data from the personal electronic device;
- a processor for generating a signal from the encoded data to simulate a reflection of a scanning beam being moved across a static visual image of a bar code formatted form of the encoded data;
- a light source for transmitting the signal as light pulses to the bar code scanner; and
- a housing containing the detector, processor, and the light source, wherein the housing is removably attachable to the personal electronic device.

16. The accessory of claim 15 wherein the housing is removably attachable to the personal electronic device by an audio connector.

17. The accessory of claim 15 wherein the housing is removably attachable to the personal electronic device by a multipurpose connector.

18. The accessory of claim 15 wherein the housing is a housing component of the personal electronic device.

19. An accessory for communicating information from a personal electronic device to a near field communication (NFC) terminal, comprising:
- a detector for receiving encoded data from the personal electronic device;
- a processor for generating an NFC protocol signal from the encoded data;
- a transmitter for transmitting the signal from the accessory to the NFC terminal; and
- a housing containing the detector, processor, and the light source, wherein the housing is distinct and separate from the personal electronic device.

20. The accessory of claim 19 further comprising attachment means for removably attachable the accessory to the personal electronic device.

21. The accessory of claim 19 wherein the housing is fob style.

22. The accessory of claim 19 wherein the housing is credit-card style.

23. An accessory for communicating information from a personal electronic device to a bar code scanner or a near field communication (NFC) terminal, comprising:
- a detector for receiving encoded data from the personal electronic device;
- a processor for generating an NFC protocol signal from the encoded data, and a simulation signal from the encoded data to simulate a reflection of a scanning beam being moved across a static visual image of a bar code formatted form of the encoded data;
- a transmitter for transmitting the NFC protocol signal to the NFC terminal; and
- a light source for transmitting the signal as light pulses from the accessory to the bar code scanner.

24. The accessory of claim 23 wherein the processor generates the NFC protocol signal and the simulation signal at different times.

25. The accessory of claim 23 wherein the processor generates the NFC protocol signal and the simulation signal at about the same time.

26. The accessory of claim 23 further comprising a housing containing the detector, processor, and the light source, wherein the housing is distinct and separate from the personal electronic device.

27. The accessory of claim 24 further comprising attachment means for removably attachable the accessory to the personal electronic device.

28. The accessory of claim 24 wherein the housing is fob style.

29. The accessory of claim 24 wherein the housing is credit-card style.

\* \* \* \* \*